United States Patent
Reynolds et al.

(10) Patent No.: US 10,882,949 B2
(45) Date of Patent: Jan. 5, 2021

(54) PROCESSABLE POLYMERS AND METHODS OF MAKING AND USING THEREOF

(71) Applicant: Georgia Tech Research Corporation, Atlanta, GA (US)

(72) Inventors: John Robert Reynolds, Dunwoody, GA (US); Rayford H. Bulloch, Portland, OR (US); Anna M. Osterholm, Atlanta, GA (US); James F. Ponder, Jr., Wellborn, FL (US)

(73) Assignee: Georgia Tech Research Corporation, Atlanta, GA (US)

( * ) Notice: Subject to any disclaimer, the term of this patent is extended or adjusted under 35 U.S.C. 154(b) by 53 days.

(21) Appl. No.: 15/745,216

(22) PCT Filed: Jul. 16, 2016

(86) PCT No.: PCT/US2016/042685
§ 371 (c)(1),
(2) Date: Jan. 16, 2018

(87) PCT Pub. No.: WO2017/011822
PCT Pub. Date: Jan. 19, 2017

(65) Prior Publication Data
US 2018/0223035 A1 Aug. 9, 2018

Related U.S. Application Data

(60) Provisional application No. 62/193,399, filed on Jul. 16, 2015.

(51) Int. Cl.
*C08G 61/12* (2006.01)
*H01G 11/26* (2013.01)
(Continued)

(52) U.S. Cl.
CPC ......... *C08G 61/126* (2013.01); *H01G 11/26* (2013.01); *H01G 11/48* (2013.01); *H01G 11/62* (2013.01);
(Continued)

(58) Field of Classification Search
CPC ........ C08G 2261/124; C08G 2261/126; C08G 2261/1424; C08G 2261/1426;
(Continued)

(56) References Cited

U.S. PATENT DOCUMENTS

| 5,395,910 A | 3/1995 | De Wit et al. |
| 7,585,983 B2 | 9/2009 | Reuter et al. |

(Continued)

FOREIGN PATENT DOCUMENTS

| EP | 1321483 A1 | 6/2003 |
| EP | 1323763 A1 | 7/2003 |

(Continued)

OTHER PUBLICATIONS

Wei et al, "Significant Enhancement of PEDOT thin film Adhesion to Inorganic Solid Substrates with EDOT-Acid", ACS Applied Materials and Interfaces, 2015, 7, pp. 15388-15394; published Jun. 8, 2015.*

(Continued)

*Primary Examiner* — Frances Tischler
(74) *Attorney, Agent, or Firm* — Thomas|Horstemeyer, LLP

(57) ABSTRACT

Conjugated copolymers are provided that can be processed in a variety of solvents and can be rendered solvent-resistant when needed. The copolymers can be solution cast from nonpolar, polar, and aqueous solvents. After casting a polymer layer, the polymer can be rendered solvent resistant, thereby providing for improved stability and multi-layer processing and in electrochromic devices where the polymer (Continued)

layer is in contact with a nonpolar or polar solvent or electrolyte. Methods of making the copolymers are also provided, as well as methods of solution casting the polymers from a variety of nonpolar organic, polar, and aqueous solvents. Electrochromic devices are demonstrated having electrode(s) containing these polymers, including a variety of supercapacitor devices capable of using organic, biological, and aqueous electrolytes. Some of these electrodes demonstrate superfast switching and large power densities, showing promise for applications in supercapacitor batteries.

15 Claims, 26 Drawing Sheets

(51) Int. Cl.
    *H01G 11/48* (2013.01)
    *H01G 11/62* (2013.01)
(52) U.S. Cl.
    CPC . *C08G 2261/124* (2013.01); *C08G 2261/126* (2013.01); *C08G 2261/148* (2013.01); *C08G 2261/1424* (2013.01); *C08G 2261/1426* (2013.01); *C08G 2261/3223* (2013.01); *C08G 2261/51* (2013.01); *C08G 2261/512* (2013.01); *C08G 2261/516* (2013.01); *Y02E 60/13* (2013.01)
(58) Field of Classification Search
    CPC ...... C08G 2261/148; C08G 2261/3223; C08G 2261/51; C08G 2261/512; C08G 2261/516; C08G 61/126; H01G 11/26; H01G 11/48; H01G 11/62; Y02E 60/13
    See application file for complete search history.

(56) References Cited

U.S. PATENT DOCUMENTS 7,807,758 B2   5/2010   Reynolds et al.

2008/0250621 A1* 10/2008 Naito ............... H01G 9/0032
                                                    29/25.03
2009/0221763 A1   9/2009   Reynolds et al.
2012/0032104 A1   2/2012   Amb et al.
2013/0056074 A1   3/2013   Isobe et al.

FOREIGN PATENT DOCUMENTS

| FR | 2947630 A1 | 1/2011 |
| JP | 2009524737 A | 7/2009 |
| JP | 2012255049 A | 12/2012 |
| WO | 03048227 A1 | 6/2003 |
| WO | 2007066353 A2 | 6/2006 |
| WO | 2007018439 A1 | 2/2007 |
| WO | 2007066353 A2 | 6/2007 |
| WO | 2014163204 | 6/2007 |
| WO | 2010141800 A1 | 12/2010 |
| WO | 2014163204 A1 | 9/2014 |

OTHER PUBLICATIONS

International Search Report for PCT/US2016/042685 dated Sep. 23, 2016.

Tang, et al., Block Copolymer Micelles with Acid-labile Ortho Ester Sidechains: Synthesis, Characterization, and Enhanced Drug Delivery to Human Glioma Cells. Journal of Control Release. vol. 151, No. 1. Apr. 10, 2011. pp. 18-27.

Amb, et al. Spray-processable Blue-to-Highly Transmissive Switching Polymer Electrochromes via the Donor-Acceptor Approach. Wiley Online Library, Dec. 15, 2009, p. 1-3. Available: https://onlinelibrary.wiley.com/doi/pdf/10.1002/adma.200902917, Accessed Jul. 26, 2018.

Konig et al. "Electrically Tunable Plasmonic Behavior of Nanocube—Polymer Nanomaterials Induced by a Redox-Active Electrochromic Polymer". ACS Nano (2014) vol. 8, No. 6, 6182-6192.

Shi et al. "Fast Switching Water Processable Electrochromic Polymers" ACS (Dec. 2012) vol. 4, 6512-6521.

Office Action dated Mar. 30, 2020 by the European Patent Office for EP16825303.7.

* cited by examiner 1. casting from chloroform
2. 10 min in KOH-methanol
3. 10 min in pTSA-methanol

PROCESSABLE POLYMERS AND METHODS OF MAKING AND USING THEREOF

CROSS-REFERENCE TO RELATED APPLICATIONS

This application is the 35 U.S.C. § 371 national stage application of PCT Application No. PCT/US2016/042685 entitled "PROCESSABLE POLYMERS AND METHODS OF MAKING AND USING THEREOF" and filed Jul. 16, 2016, where the PCT claims priority to and the benefit of U.S. provisional application entitled "Conjugated Polyelectrolytes as Water Processable Precursors to Organic and Aqueous Compatible Polymers for Charge Storage, Electrochromic and Bioelectronic Applications" having Ser. No. 62/193,399 filed Jul. 16, 2015, the contents of which are incorporated by reference in their entirety.

STATEMENT REGARDING FEDERALLY SPONSORED RESEARCH OR DEVELOPMENT

This invention was made with government support under award N00014-14-1-0399 awarded by the Office of Naval Research. The government has certain rights in the invention.

TECHNICAL FIELD

The present disclosure generally relates to conjugated polymers that are processable from a variety of solvents, especially from polar solvents.

BACKGROUND

Solution processing and casting of polymers maintains numerous advantages, including the ability to process at low temperatures, ability to achieve uniform and reproducible polymer layers, and the ability to perform roll-to-roll processing. In polymer solution casting, polymer is dissolved or dispersed in solution, coated onto a carrier substrate, and then the solvent is removed to create a solid polymer layer on the substrate.

Conjugated polymers, because of their unique combination of plastic and semiconducting properties, are a remarkable class of polymeric materials for electro-optical devices. The band gaps of most conjugated polymers occur in the visible region of the spectrum, and the emission color can be tuned to essentially any desired wavelength region by altering the chemical nature of either the polymer backbone or the side groups. Although conjugated polymers can be solution processed in organic solvents, the electrical and optical quality of the film can depend strongly upon the solvent and deposition method.

While many conjugated polymers have been reported via solution processing, these are typically dissolved in common organic solvents, making it straightforward to prepare uniform, large area, and flexible thin films of these materials by spin-casting or dip-coating. One extremely important issue in any high throughput polymer solution processing is finding suitable polymer inks based on nontoxic/nonpolluting solvents, with water being both the cheapest and most environmentally friendly. Unfortunately, very few conjugated polymers have been reported processed from aqueous solution and on a large scale. Furthermore, for large-scale manufacturing, the use of many organic solvents may be undesirable due to human and environmental exposure and associated costs. There remains a need for improved conjugated polymers that can be processed from a broader range of solvents, including both nonpolar and polar solvents, and including aqueous solvents.

For multi-layer devices, the devices are often processed layer-by-layer, meaning that the next layer may be processed from solution directly onto the adjacent polymer layer. If we wish to process everything from water or other polar solvents, careful consideration towards the potential of damaging layers that have already been processed will need to be taken. In some electrochromic devices, for instance, the polymer layer may be in contact with an aqueous, polar, or nonpolar electrolyte, which could lead to damage to the polymer layer if it is soluble in the electrolyte. Having new conjugated polymers that, once deposited, can withstand solvents from multi-layer deposition or from adjacent solvent or electrolyte layers would be advantageous.

SUMMARY

A variety of solution processable copolymers are provided that overcome the aforementioned deficiencies. Conjugated copolymers are provided that can be processed in a variety of solvents and can be rendered solvent-resistant when needed. In various aspects, the copolymers can be solution cast from nonpolar, polar, and aqueous solvents. After casting a polymer layer, the polymer can be rendered solvent resistant, thereby providing for improved stability and multi-layer processing and in electrochromic devices where the polymer layer is in contact with a nonpolar or polar solvent or electrolyte. Methods of making the copolymers are also provided, as well as methods of solution casting the polymers from a variety of nonpolar organic, polar, and aqueous solvents. Electrochromic devices are demonstrated having electrode(s) containing these polymers, including a variety of supercapacitor devices capable of using organic, biological, and aqueous electrolytes. Some of these electrodes demonstrate superfast switching and large power densities, showing promise for applications in supercapacitor batteries.

In various aspects, conjugated copolymers are provided having a plurality of a first monomer subunit having one or more side chains that contain an ester of an acid and a hydrophobic solubilizing group, and a plurality of a second monomer subunit that does not have the ester side chains. In various aspects, the hydrophobic solubilizing group can be removed to leave the acid in the side chain as an anion or a salt thereof. The number of first monomer subunits in the conjugated copolymer can be at least the minimum number of first monomer subunits such that the conjugated copolymer is soluble in organic solvents but not in water. The number of first monomer subunits in the conjugated copolymer can be at least the minimum number of first monomer subunits such that the conjugated copolymer is soluble in polar solvents but not in non-polar solvents whenever the hydrophobic solubilizing group on each side chain has been removed to leave the acid in the side chain as the anion or salt thereof. In various aspects, conjugated copolymers are provided having a plurality of a first monomer subunit having one or more side chains containing the anionic conjugate base of an acid or a salt thereof and a plurality of a second monomer subunit that does not have the anionic conjugate base or salt thereof, wherein the number of first monomer subunits in the conjugated copolymer is at least the minimum number of first monomer subunits such that the conjugated copolymer is soluble in polar solvents but not in non-polar solvents. In various aspects, conjugated copolymers are provided having a plurality of a first monomer subunit having one or more side chains containing an acid and a plurality of a second monomer subunit that does not have the acid, wherein the number of first monomer subunits in the conjugated copolymer is at least the minimum number of first monomer subunits such that the conjugated copolymer solvent resistant. The acid can include a carboxylic acid, a thiocarboxylic acid, a dithiocarboxylic acid, a phosphonic acid, a boronic acid, or a combination thereof. In various aspects, the acid is a carboxylic acid and the anion is a carbon/late anion. The acid can be an aromatic carboxylic acid or an aromatic phosphonic acid.

In a variety of aspects, the first monomer subunit of the conjugated copolymer has a structure according to any one of the following formulas or a derivative thereof:

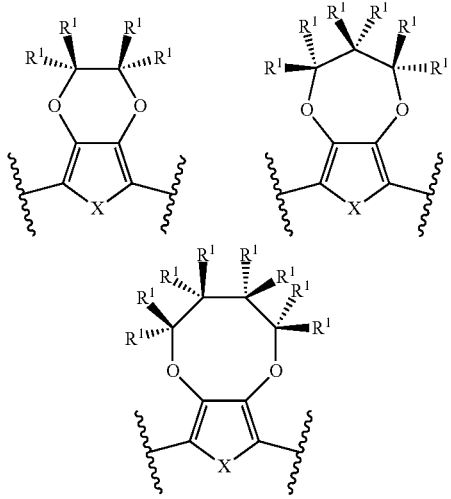

wherein each occurrence of $R^1$ is independently $R^4(CO_2R^5)_n$, H, $C_1$-$C_{30}$ alkyl sidechains, $C_2$-$C_{30}$ alkenyl side chains, $C_2$-$C_{30}$ alkynyl side chains, $C_3$-$C_{30}$ cycloalkyl side chains, $C_1$-$C_{30}$ heterocycloalkyl side chains, $C_3$-$C_{30}$ cycloalkenyl side chains, $C_1$-$C_{30}$ heterocycloalkenyl side chains, aryl side chains, heteroaryl side chains, or a combination thereof, so long as at least one occurrence of $R^1$ is $R^4(CO_2R^5)_n$. In certain aspects, each occurrence of $R^4$ is independently a substituted and unsubstituted $C_1$-$C_{18}$ alkyl, substituted and unsubstituted $C_2$-$C_{18}$ alkenyl, substituted and unsubstituted $C_2$-$C_{18}$ alkynyl, substituted and unsubstituted $C_3$-$C_{18}$ cycloalkyl, substituted and unsubstituted $C_1$-$C_{18}$ heterocycloalkyl, substituted and unsubstituted $C_3$-$C_{18}$ cycloalkenyl, substituted and unsubstituted $C_1$-$C_{18}$ heterocycloalkenyl, substituted and unsubstituted aryl, or a substituted or unsubstituted heteroaryl. In a variety of these aspects, $R^5$ is independently selected from the group consisting of substituted and unsubstituted $C_4$-$C_{30}$ alkyl, substituted and unsubstituted $C_4$-$C_{30}$ heteroalkyl, substituted and unsubstituted $C_4$-$C_{30}$ alkenyl, substituted and unsubstituted $C_4$-$C_{30}$ alkynyl, substituted and unsubstituted $C_4$-$C_{30}$ cycloalkyl, substituted and unsubstituted $C_4$-$C_{30}$ heterocycloalkyl, substituted and unsubstituted $C_4$-$C_{30}$ cycloalkenyl, and substituted and unsubstituted $C_4$-$C_{30}$ heterocycloalkenyl. In some embodiments, X is independently S, Se, O, or NR, where R is a H, phenyl, benzyl, or $C_1$-$C_{30}$ substituent. In various embodiments, n is independently an integer from 1 to 4. In various aspects, each occurrence of $R^4$ is substituted or unsubstituted aryl, or substituted or unsubstituted heteroaryl; each occurrence of $R^5$ is substituted or unsubstituted $C_4$-$C_{30}$ alkyl, substituted or unsubstituted $C_4$-$C_{30}$ heteroalkyl, substituted or unsubstituted $C_4$-$C_{30}$ cycloalkyl, or substituted or unsubstituted $C_4$-$C_{30}$ heterocycloalkyl, and at least two occurrences of $R^1$ have the structure $R^4(CO_2R^5)_n$.

In various aspects, conjugated copolymers are provided, wherein the first monomer subunit has a structure according to according to any one of the following formulas or a derivative thereof:

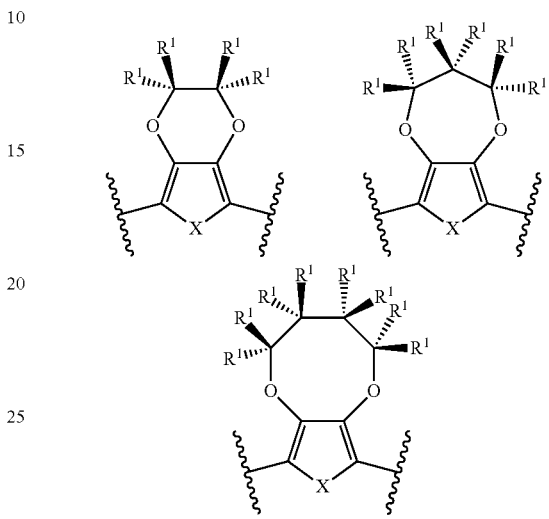

wherein each occurrence of $R^1$ is independently $R^9(CO_2^-)_p$, H, $C_1$-$C_{30}$ alkyl sidechains, $C_2$-$C_{30}$ alkenyl side chains, $C_2$-$C_{30}$ alkynyl side chains, $C_3$-$C_{30}$ cycloalkyl side chains, $C_1$-$C_{30}$ heterocycloalkyl side chains, $C_3$-$C_{30}$ cycloalkenyl side chains, $C_1$-$C_{30}$ heterocycloalkenyl side chains, aryl side chains, heteroaryl side chains, or a combination thereof, so long as at least one occurrence of $R^1$ is $R^9(CO_2)_p$. In various aspects, each occurrence of $R^9$ is independently substituted or unsubstituted $C_1$-$C_{18}$ alkyl, substituted or unsubstituted $C_2$-$C_{18}$ alkenyl, substituted or unsubstituted $C_2$-$C_{18}$ alkynyl, substituted or unsubstituted $C_3$-$C_{18}$ cycloalkyl, substituted or unsubstituted $C_1$-$C_{18}$ heterocycloalkyl, substituted an or d unsubstituted $C_3$-$C_{18}$ cycloalkenyl, substituted or unsubstituted $C_1$-$C_{18}$ heterocycloalkenyl, substituted or unsubstituted aryl, or substituted or unsubstituted heteroaryl. In some embodiments, X is S, Se, O, and NR, where R is a H, phenyl, benzyl, or $C_1$-$C_{30}$ substituent. In some aspects, p is an integer from 1 to 4. In various embodiments, $R^9$ is a substituted or unsubstituted aryl, or a substituted or unsubstituted heteroaryl, wherein at least two occurrences of $R^1$ have the structure $R^9(CO_2^-)_p$.

In various embodiments, conjugated copolymers are provided, wherein the first monomer subunit has a structure according any one of the following formulas or a derivative thereof:

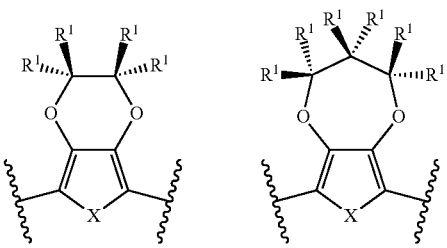

-continued

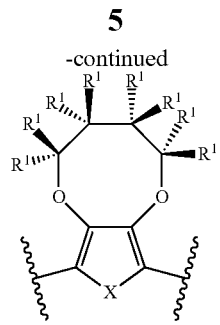

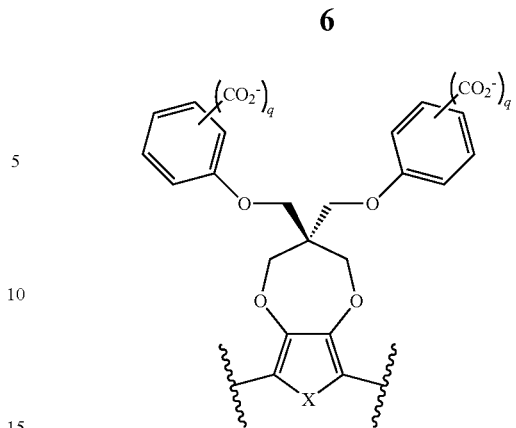

wherein each occurrence of $R^1$ is independently selected from the group c $C_1$-$C_{30}$ carboxylic acids, $C_1$-$C_{30}$ thiocarboxylic acids, $C_1$-$C_{30}$ dithiocarboxylic acids, $C_1$-$C_{30}$ phosphonic acids, $C_1$-$C_{30}$ boronic acids, H, $C_1$-$C_{30}$ alkyl side-chains, $C_2$-$C_{30}$ alkenyl side chains, $C_2$-$C_{30}$ alkynyl side chains, $C_3$-$C_{30}$ cycloalkyl side chains, $C_1$-$C_{30}$ heterocycloalkyl side chains, $C_3$-$C_{30}$ cycloalkenyl side chains, $C_1$-$C_{30}$ heterocycloalkenyl side chains, aryl side chains, heteroaryl side chains, and a combination thereof, so long as at least one occurrence of $R^1$ is a $C_1$-$C_{30}$ carboxylic acid, $C_1$-$C_{30}$ thiocarboxylic acid, $C_1$-$C_{30}$ dithiocarboxylic acid, $C_1$-$C_{30}$ phosphonic acid, or a $C_1$-$C_{30}$ boronic acid. In various aspects, X is S, Se, O, or NR, where R is a H, phenyl, benzyl, or $C_1$-$C_{30}$ substituent. In various aspects, the $R^1$ are independently selected from the group consisting of substituted and unsubstituted $C_1$-$C_{30}$ aromatic carboxylic acids and substituted and unsubstituted $C_1$-$C_{30}$ aromatic phosphonic acids. In some embodiments, at least two occurrences of $R^1$ are aromatic carboxylic acids.

In various aspects, conjugated copolymers are providing having a structure according to the following formula or a derivative thereof

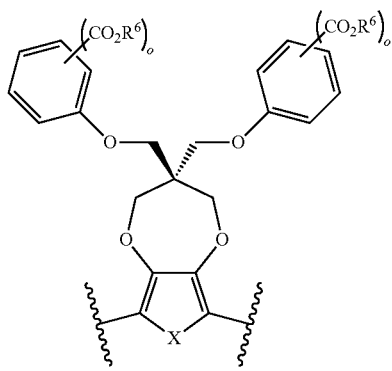

wherein each occurrence of $R^6$ is independently substituted and unsubstituted $C_4$-$C_{30}$ alkyl, substituted and unsubstituted $C_4$-$C_{30}$ heteroalkyl, substituted and unsubstituted $C_4$-$C_{30}$ alkenyl, substituted and unsubstituted $C_4$-$C_{30}$ alkynyl, substituted and unsubstituted $C_4$-$C_{30}$ cycloalkyl, substituted and unsubstituted $C_4$-$C_{30}$ heterocycloalkyl, substituted and unsubstituted $C_4$-$C_{30}$ cycloalkenyl, or substituted and unsubstituted $C_4$-$C_{30}$ heterocycloalkenyl. In some embodiments, X is S, Se, O, or NR, where R is a H, phenyl, benzyl, or $C_1$-$C_{30}$ substituent. In various aspects o is an integer from 1 to 4.

In a variety of embodiments, conjugated copolymers are provided, wherein the first monomer subunit has a structure according to the following formula or a salt or derivative thereof wherein each occurrence of X is independently S, Se, O, and NR, where R is a H, phenyl, benzyl, or $C_1$-$C_{30}$ substituent, and wherein each occurrence of q is independently an integer from 1 to 4.

In some embodiments, conjugated copolymers are provided wherein the first monomer subunit has a structure according to the following formula or a derivative thereof

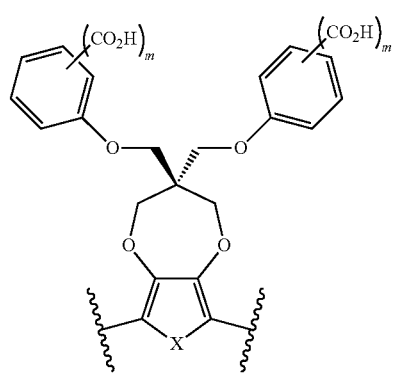

wherein each occurrence of X is independently S, Se, O, and NR, where R is a H, phenyl, benzyl, or $C_1$-$C_{30}$ substituent, and wherein each occurrence of m is independently an integer from 1 to 4.

In a variety of embodiments, the conjugated copolymers have repeat units having a structure selected from the group consisting of A-B, A-B-B, A-B-B-B, A-B-B-B-B, A-A-B, and A-A-B-B. In various aspects, B represents the second monomer subunit and has a structure selected from the group consisting of structures according to Formula 1B, Formula 2B, Formula 3B, Formula 4B, Formula 5B, Formula 6B, and derivatives thereof Formula 1B

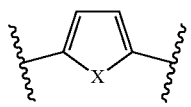

Formula 2B

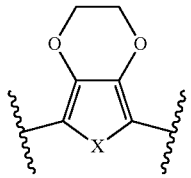

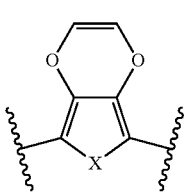

Formula 3B

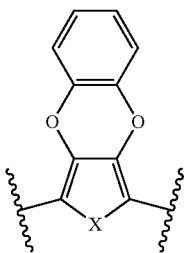

Formula 4B

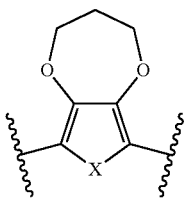

Formula 5B

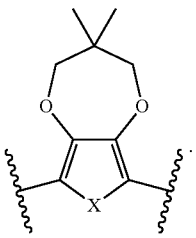

Formula 6B

In various aspects, each occurrence of X is independently S, Se, O, or NR, where R is a H, phenyl, benzyl, or $C_1$-$C_{30}$ substituent. In some embodiments, In some aspects, A represents the first monomer subunit and has a structure according to Formula 7A or a derivative thereof;

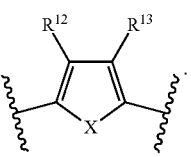

Formula 7A wherein each occurrence of $R^{12}$ is the anionic conjugate base of an acid such as substituted and unsubstituted $C_2$-$C_{30}$ carboxylic acids, substituted and unsubstituted $C_2$-$C_{30}$ di-carboxylic acids, substituted and unsubstituted $C_2$-$C_{30}$ tri-carboxylic acids, or derivatives thereof, and each occurrence of $R^{13}$ is independently selected from the group consisting of hydrogen, substituted and unsubstituted $C_1$-$C_{30}$ alkyl, substituted and unsubstituted $C_2$-$C_{30}$ alkenyl, substituted and unsubstituted $C_2$-$C_{30}$ alkynyl, substituted and unsubstituted $C_3$-$C_{30}$ cycloalkyl, substituted and unsubstituted $C_1$-$C_{30}$ heterocycloalkyl, substituted and unsubstituted $C_3$-$C_{30}$ cycloalkenyl, substituted and unsubstituted $C_1$-$C_{30}$ heterocycloalkenyl, substituted and unsubstituted aryl, and substituted and unsubstituted heteroaryl, and the anionic conjugate base of an acid independently selected from the group consisting of substituted and unsubstituted $C_2$-$C_{30}$ carboxylic acids, substituted and unsubstituted $C_2$-$C_{30}$ di-carboxylic acids, substituted and unsubstituted $C_2$-$C_{30}$ tri-carboxylic acids, and derivatives thereof; or wherein each occurrence of $R^{12}$ and $R^{13}$, when taken together and with the atoms to which they are attached, are selected from the group consisting of substituted and unsubstituted $C_6$-$C_{40}$ cycloalkyl, heterocycloalkyl, cycloalkenyl, heterocycloalkenyl, aryl, and heteraryl groups having from 1 to 6 anionic acid substituents.

In certain aspects, A represents the first monomer subunit and has a structure according to Formula 1A or a derivative thereof;

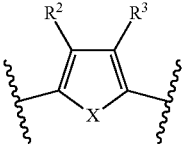

Formula 1A wherein each occurrence of $R^2$ is independently selected from the group consisting of substituted and unsubstituted $C_2$-$C_{30}$ carboxylic acids, substituted and unsubstituted $C_2$-$C_{30}$ thiocarboxylic acids, substituted and unsubstituted $C_2$-$C_{30}$ dithiocarboxylic acids, substituted and unsubstituted $C_2$-$C_{30}$ phosphonic acids, substituted and unsubstituted $C_2$-$C_{30}$ boronic acids, and a combination thereof, and each occurrence of $R^3$ is independently selected from the group consisting of hydrogen, substituted and unsubstituted $C_1$-$C_{30}$ alkyl, substituted and unsubstituted $C_2$-$C_{30}$ alkenyl, substituted and unsubstituted $C_2$-$C_{30}$ alkynyl, substituted and unsubstituted $C_3$-$C_{30}$ cycloalkyl, substituted and unsubstituted $C_1$-$C_{30}$ heterocycloalkyl, substituted and unsubstituted $C_3$-$C_{30}$ cycloalkenyl, substituted and unsubstituted $C_1$-$C_{30}$ heterocycloalkenyl, substituted and unsubstituted aryl, and substituted and unsubstituted heteroaryl, substituted and unsubstituted $C_2$-$C_{30}$ carboxylic acids, substituted and unsubstituted $C_2$-$C_{30}$ thiocarboxylic acids, substituted and unsubstituted $C_2$-$C_{30}$ dithiocarboxylic acids, substituted and unsubstituted $C_2$-$C_{30}$ phosphonic acids, substituted and unsubstituted $C_2$-$C_{30}$ boronic acids, and a combination thereof; or wherein each occurrence of $R^2$ and $R^3$, when taken together and with the atoms to which they are attached, are selected from the group consisting of substituted and unsubstituted $C_6$-$C_{40}$ cycloalkyl, heterocycloalkyl, cycloalkenyl, heterocycloalkenyl, aryl, and heteraryl groups having from 1 to 6 acid substituents independently selected from the group consisting of carboxylic acids, thiocarboxylic acids, dithiocarboxylic acids, phosphonic acids, and boronic acids.

Methods of making electrodes from the conjugated copolymers are also provided. The methods can include casting the polymer from a variety of solvents and under a variety of conditions. The casting step can include a method selected from the group consisting of drop casting, dip coating, spin coating, blade coating, spray coating, inkjet printing, gravure printing, roll coating, and a combination thereof. The methods can be used to cast the conjugated copolymer on a variety of substrates. In various aspects, the layer of the conjugated copolymer has an average thickness of about 100 nm to about 2.5 µm.

Methods of casting from a polar solvent can include (a) casting a solution containing a conjugated copolymer and a polar solvent onto a surface of a substrate to form a film, wherein the conjugated copolymer has a plurality of a first monomer subunit having one or more side chains containing an anionic conjugate base of an acid or a salt thereof and a plurality of a second monomer subunit that does not have the anionic conjugate base, and wherein the number of first monomer subunits in the conjugated copolymer is at least the minimum number of first monomer subunits such that the conjugated copolymer is soluble in the polar solvent; (b) treating the film having the conjugated copolymer with an acid to convert the anionic conjugate base into the acid form to produce the electrode having a layer of the conjugated copolymer on the surface of the substrate; wherein the number of first monomer subunits in the conjugated copolymer is at least the minimum number of first monomer subunits such that the conjugated copolymer is solvent resistant. Suitable polar solvents can include water, methanol, ethanol, isopropanol, dimethylformamide, dimethylacetamide, dimethylsulfoxide, and mixtures thereof.

Methods of casting from nonpolar organic solvents can include (a) casting a solution having a conjugated copolymer and a nonpolar solvent onto a surface of a substrate to form a film, wherein the conjugated copolymer has a plurality of a first monomer subunit having one or more side chains containing an ester of an acid and a hydrophobic solubilizing group and a plurality of a second monomer subunit that does not have the ester, and wherein the number of first monomer subunits in the conjugated copolymer is at least the minimum number of first monomer subunits such that the conjugated copolymer is soluble in the nonpolar solvent; (b) treating the film having the conjugated copolymer with a hydroxide to convert the ester into an anionic conjugate base of the acid or a salt thereof; and (c) treating the film with an acid to convert the anionic conjugate base into the acid form to produce the electrode having a layer of the conjugated copolymer on the surface of the substrate; wherein the number of first monomer subunits in the conjugated copolymer is at least the minimum number of first monomer subunits such that the conjugated copolymer is solvent resistant. Suitable nonpolar solvents can include chloroform, xylene, toluene, dimethyl benzene, and mixtures thereof.

In various aspects, the second monomer subunits have an oxidation potential lower than or equal to the oxidation potential of the first monomer subunits, and the number of second monomer subunits in the conjugated copolymer is at least the minimum number of second monomer subunits to lower the oxidation onset of the conjugated copolymer as compared to the oxidation onset of the otherwise same polymer except without the second monomer subunits when measured under the same conditions.

A variety of electrodes and electrochemical devices made therefrom are also provided. The electrode can include a conducting substrate and a layer of a conjugated copolymer, wherein the conjugated copolymer has a plurality of a first monomer subunit having one or more acid side chains and a plurality of a second monomer subunit that does not have the acid side chains, wherein the number of first monomer subunits in the conjugated copolymer is at least the minimum number of first monomer subunits such that the conjugated copolymer is solvent resistant. The conjugated copolymer can be any of the solvent resistant copolymers provided herein.

The conducting substrate can be a conducting plastic substrate, conducting paper substrate, a conducting textile substrate, conducting cellulose substrate, a carbon nanotube substrate, a graphite or graphene substrate, a carbon foam substrate, a metal substrate, a metal oxide substrate, or a conductive polymer substrate. The mass loading of the conjugated copolymer onto the substrate can be about 20% to 200% (w/w/) based upon the weight of the substrate. In various aspects, the layer of the conjugated copolymer can have an average thickness of about 100 nm to 2.5 μm.

A variety of supercapacitors and electrochemical devices are provided including one of the electrodes. In some regards, the supercapacitor includes two electrodes in contact with an electrolyte, wherein at least one of the electrodes has a structure described herein. A variety of electrolytes can be employed with the solvent resistant polymers described herein. The electrolyte can include an organic electrolyte, an aqueous electrolyte, a biological electrolyte, a solid state electrolyte, or a combination thereof. The electrolyte can be an aqueous salt solution or an organic salt solution having a salt selected from the group sodium chloride, potassium chloride, tetrabutylammonium hexafluorophosphate (TBAPF6), and lithium bis(trifluoromethylsulfonyl)imide (LiBTI).

In some aspects, supercapacitors are provided where both electrodes have a solvent resistant structure described herein. The supercapacitor can be a symmetrical device having the electrolyte between the two electrodes. In some embodiments, the supercapacitor is an asymmetrical supercapacitor and each of the electrodes contains a different conducting substrate from the other electrode. In some aspects, the supercapacitor is an asymmetrical supercapacitor and each of the electrodes contains a different conjugated copolymer from the other electrode. In some embodiments, the supercapacitor is an asymmetrical supercapacitor, wherein only one of the electrodes has a solvent resistant structure described herein.

A variety of additional electrochemical devices are provided using these electrodes, including supercapacitors and electrochromic devices.

Other systems, methods, features, and advantages of processable copolymers and electrodes made therefrom will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 11B) Calculated specific capacitance from cyclic voltammetry at 20 mV/s and 200 mV/s as a function of mass loading of PE$_2$. (FIG. 11C) Energy and (FIG. 11D) Power density as a function of polymer mass loading for symmetrical CNT-T/ProDOT-EDOT$_2$ devices at each scan rate 20-200 mV/s.

(FIG. 12B) 100 wt % device capacitance and peak current as a function of scan rate (20-200 mV/s). (FIG. 12C) Galvanic cycling of 100 wt % device at 0.5, 1, and 2 A/g. (FIG. 12D) Nyquist plot of CNT-T/ProDOT-EDOT$_2$ device measured from 100 mHz to 100 kHz in 0.5 M KCl.

DETAILED DESCRIPTION

Figure 1:
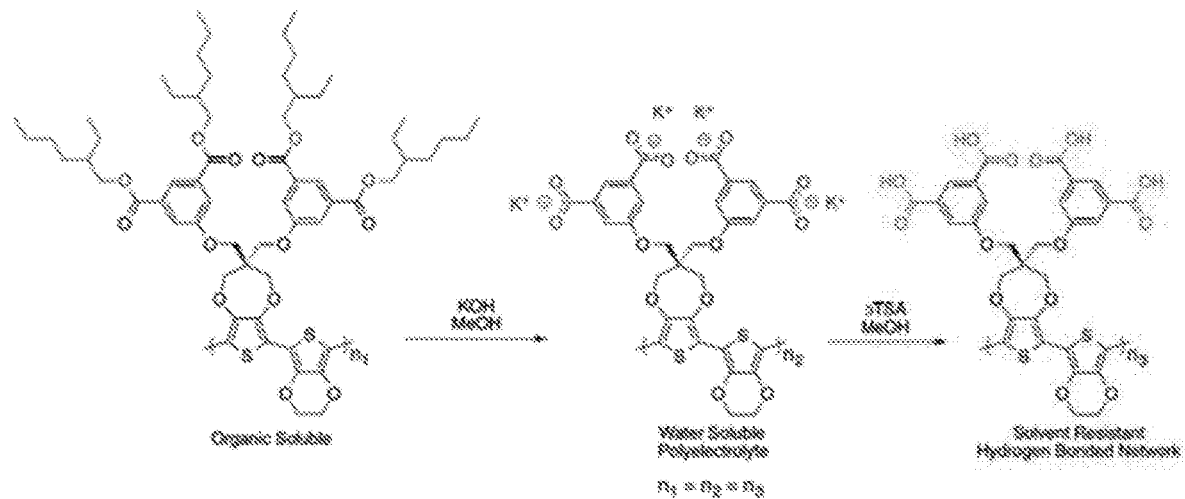
FIG. 1 is a schematic depicting the interchangeability of the side chains in an exemplary conjugated copolymer where (left) long-chain alkyl esters provide the copolymer with solubility in organic solvents, (center) treatment with a base such as a metal or organic hydroxide converts the polymer into the polyelectrolyte form, rendering it soluble in water, and (right) treatment with acid converts the polyelectrolyte into a hydrogen-bonded neutral acid form that is solvent-resistant to both polar and nonpolar solvents.

In various aspects, conjugated copolymers are provided that can be processed in a variety of solvents and can be rendered solvent-resistant when needed. The copolymers can be solution cast from nonpolar, polar, and aqueous solvents. After casting a polymer layer, the polymer can be rendered solvent resistant, thereby providing for improved stability and multi-layer processing and in electrochromic devices where the polymer layer is in contact with a nonpolar or polar solvent or electrolyte. Methods of making the copolymers are also provided, as well as methods of solution casting the polymers from a variety of nonpolar organic, polar, and aqueous solvents. Electrochromic devices are demonstrated having electrode(s) containing these polymers, including a variety of supercapacitor devices capable of using organic, biological, and aqueous electrolytes without damage to the polymer electrode. Some of these electrodes demonstrate superfast switching and large power densities, showing promise for applications in supercapacitor batteries.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "solubility," as used with respect to specific polymers described herein, refers to the polymer concentration in a solvent at the point of saturation when measured at a given temperature and pH. The polymer concentration, unless otherwise indicated, will be reported as the mass of polymer dissolved, solvated, suspended, or dispersed in a specified volume, typically reported in units of milligrams per milliliter (mg/mL) unless specified differently. Unless otherwise specified, the solubility is measured at about 21° C. and at a pH of about 6.5-8.5. The solubility is solvent-specific, and for many of the polymers described herein, the polymer may be soluble in a particular solvent or class of solvents and insoluble in another solvent or class of solvents.

The term "soluble," as used to describe polymers herein, refers to a polymer having a solubility in the specified solvent or class of solvents of at least about 0.5 mg/mL, 1 mg/mL, 2 mg/mL, 3 mg/mL, 4 mg/mL, 5 mg/mL, 10 mg/mL, 15 mg/mL, or more The term "insoluble," as used to describe polymers herein, refers to a polymer having a solubility in the specified solvent or class of solvents of less than 0.01 mg/mL, 0.005 mg/mL, 0.001 mg/mL, or 0.0005 mg/mL or to a polymer that has zero solubility in the specified solvent or class of solvents.

The term "solvent resistant," as used herein, refers to a polymer that is insoluble in both aqueous and organic solvents, e.g. water and chloroform, at a pH of about 1 to 9, about 5 to 9, or about 6 to 7 and at a temperature of about 20° C. to 80° C., about 20° C. to 60° C., about 20° C. to 40° C.

The term "aqueous solvent," as generally used herein, refers to a solvent that is predominantly water, e.g. at least about 80% (w/w), 90% (w/w), 95% (w/w) water based upon the weight of the solvent. The term "polar solvent," as generally used herein, refers to aqueous solvents, other solvents having a dielectric constants of at least 17 or at least 20, and mixtures of these solvents. The term "nonpolar solvent," as generally used herein, refers to solvents having a dielectric constant less than 12, 10, or 5, and mixtures thereof.

The term "small molecule", as used herein, generally refers to an organic molecule that is less than 2000 g/mol in molecular weight, less than 1500 g/mol, less than 1000 g/mol, less than 800 g/mol, or less than 500 g/mol. Small molecules are non-polymeric and/or non-oligomeric.

The term "copolymer" as used herein, generally refers to a single polymeric material that is comprised of two or more different monomers. The copolymer can be of any form, such as random, block, graft, etc. The copolymers can have any end-group, including capped or acid end groups. Copolymers can alternating copolymers (having regularly alternating monomer units, e.g. A-B-A-B-A-B), periodic copolymers (having a regularly repeating sequence of monomer units, e.g. A-B-B-A-B-B-A-B-B), statistical copolymers (the order of monomers follows a nearly statistical distribution), a block copolymer (having blocks of a first monomer attached to blocks of a second monomer unit), or a combination thereof. Copolymers can include linear or branched copolymers.

The term "molecular weight", as used herein, generally refers to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight ($M_w$) as opposed to the number-average molecular weight ($M_n$). Capillary viscometry provides estimates of molecular weight as the inherent viscosity determined from a dilute polymer solution using a particular set of concentration, temperature, and solvent conditions. Unless otherwise specified, the molecular weight of a polymer can be the number average molecular weight ($M_n$) or the weight average molecular weight ($M_w$).

The term "alkyl" refers to the radical of saturated aliphatic groups, including straight-chain alkyl groups, branched-chain alkyl groups, cycloalkyl (alicyclic) groups, alkyl-substituted cycloalkyl groups, and cycloalkyl-substituted alkyl groups.

In some embodiments, a straight chain or branched chain alkyl has 30 or fewer carbon atoms in its backbone (e.g., $C_1$-$C_{30}$ for straight chains, $C_3$-$C_{30}$ for branched chains), 20 or fewer, 12 or fewer, or 7 or fewer. Likewise, in some embodiments cycloalkyls have from 3-10 carbon atoms in their ring structure, e.g. have 5, 6 or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, a hosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, or from one to six carbon atoms in its backbone structure. Likewise, "lower alkenyl" and "lower alkynyl" have similar chain lengths. Throughout the application, preferred alkyl groups are lower alkyls. In some embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In some embodiments, the "alkylthio" moiety is represented by one of —S-alkyl, —S-alkenyl, and —S-alkynyl. Representative alkylthio groups include methylthio, and ethylthio. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

The terms "alkoxyl" or "alkoxy" as used herein refers to an alkyl group, as defined above, having an oxygen radical attached thereto. Representative alkoxyl groups include methoxy, ethoxy, propyloxy, and tert-butoxy. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O-alkynyl. Aroxy can be represented by —O-aryl or O-heteroaryl, wherein aryl and heteroaryl are as defined below. The alkoxy and aroxy groups can be substituted as described above for alkyl.

The terms "amine" and "amino" are art-recognized and refer to both unsubstituted and substituted amines, e.g., a moiety that can be represented by the general formula:

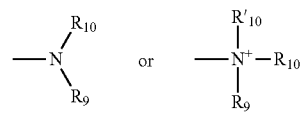

wherein R9, R10, and R'10 each independently represent a hydrogen, an alkyl, an alkenyl, —(CH2)m-R8 or R9 and R10 taken together with the N atom to which they are attached complete a heterocycle having from 4 to 8 atoms in the ring structure; R8 represents an aryl, a cycloalkyl, a cycloalkenyl, a heterocycle or a polycycle; and m is zero or an integer in the range of 1 to 8. In some embodiments, only one of R9 or R10 can be a carbonyl, e.g., R9, R10 and the nitrogen together do not form an imide. In still other embodiments, the term "amine" does not encompass amides, e.g., wherein one of R9 and R10 represents a carbonyl. In additional embodiments, R9 and R10 (and optionally R'10) each independently represent a hydrogen, an alkyl or cycloakly, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of R9 and R10 is an alkyl group.

The term "amido" is art-recognized as an amino-substituted carbonyl and includes a moiety that can be represented by the general formula:

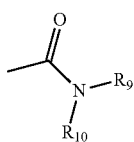

wherein R9 and R10 are as defined above.

"Aryl", as used herein, refers to $C_5$-$C_{10}$-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN; and combinations thereof.

The term "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. One or more of the rings can be substituted as defined above for "aryl".

The term "aralkyl", as used herein, refers to an alkyl group substituted with an aryl group (e.g., an aromatic or heteroaromatic group).

The term "carbocycle", as used herein, refers to an aromatic or non-aromatic ring in which each atom of the ring is carbon.

"Heterocycle" or "heterocyclic", as used herein, refers to a cyclic radical attached via a ring carbon or nitrogen of a monocyclic or bicyclic ring containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, ($C_1$-$C_{10}$) alkyl, phenyl or benzyl, and optionally containing 1-3 double bonds and optionally substituted with one or more substituents. Examples of heterocyclic ring include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, and —CN.

The term "carbonyl" is art-recognized and includes such moieties as can be represented by the general formula:

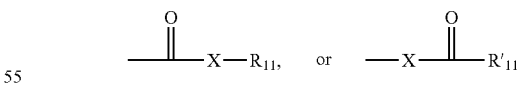

wherein X is a bond or represents an oxygen or a sulfur, and $R_{11}$ represents a hydrogen, an alkyl, a cycloalkyl, an alkenyl, an cycloalkenyl, or an alkynyl, $R'_{11}$ represents a hydrogen, an alkyl, a cycloalkyl, an alkenyl, an cycloalkenyl, or an alkynyl. Where X is an oxygen and $R_{11}$ or $R'_{11}$ is not hydrogen, the formula represents an "ester". Where X is an oxygen and $R_{11}$ is as defined above, the moiety is referred to herein as a carboxyl group, and particularly when $R_{11}$ is a hydrogen, the formula represents a "carboxylic acid". Where X is an oxygen and $R'_{11}$ is hydrogen, the formula represents a "formate". In general, where the oxygen atom of the above formula is replaced by sulfur, the formula represents a "thiocarbonyl" group. Where X is a sulfur and $R_{11}$ or $R'_{11}$ is not hydrogen, the formula represents a "thioester." Where X is a sulfur and $R_{11}$ is hydrogen, the formula represents a "thiocarboxylic acid." Where X is a sulfur and $R'_{11}$ is hydrogen, the formula represents a "thioformate." On the other hand, where X is a bond, and $R_{11}$ is not hydrogen, the above formula represents a "ketone" group. Where X is a bond, and $R_{11}$ is hydrogen, the above formula represents an "aldehyde" group.

The term "monoester" as used herein refers to an analogue of a dicarboxylic acid wherein one of the carboxylic acids is functionalized as an ester and the other carboxylic acid is a free carboxylic acid or salt of a carboxylic acid. Examples of monoesters include, but are not limited to, to monoesters of succinic acid, glutaric acid, adipic acid, suberic acid, sebacic acid, azelaic acid, oxalic and maleic acid.

The term "heteroatom" as used herein means an atom of any element other than carbon or hydrogen. Examples of heteroatoms are boron, nitrogen, oxygen, phosphorus, sulfur and selenium. Other heteroatoms include silicon and arsenic.

As used herein, the term "nitro" means $-NO_2$; the term "halogen" designates $-F$, $-Cl$, $-Br$ or $-I$; the term "sulfhydryl" means $-SH$; the term "hydroxyl" means $-OH$; and the term "sulfonyl" means $-SO_2-$.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted $C_3$-$C_{20}$ cyclic, heterocyclic, substituted heterocyclic, aminoacid, peptide, and polypeptide groups.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e. a compound that does not spontaneously undergo transformation such as by rearrangement, cyclization, elimination, etc.

In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. The heteroatoms such as nitrogen may have hydrogen substituents and/or any permissible substituents of organic compounds described herein which satisfy the valencies of the heteroatoms.

In various embodiments, the substituent is selected from alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide, and thioketone, each of which optionally is substituted with one or more suitable substituents. In some embodiments, the substituent is selected from alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone, wherein each of the alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone can be further substituted with one or more suitable substituents.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, thioketone, ester, heterocyclyl, $-CN$, aryl, aryloxy, perhaloalkoxy, aralkoxy, heteroaryl, heteroaryloxy, heteroarylalkyl, heteroaralkoxy, azido, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like. In some embodiments, the substituent is selected from cyano, halogen, hydroxyl, and nitro.

Processable Copolymers

A variety of copolymers are provided herein that can be processed from both polar and nonpolar solvents. The copolymers are conjugated copolymers, i.e. they have backbone of alternating double and single bonds that lead to extended electron delocalization over a number of monomeric units in the polymer. In various aspects, the copolymers can be processed from a large variety of solvents due to the presence of a plurality of processability enhancing side chains along the backbone of the copolymer. The can be better understand by considering an exemplary conjugated copolymer, depicted below.

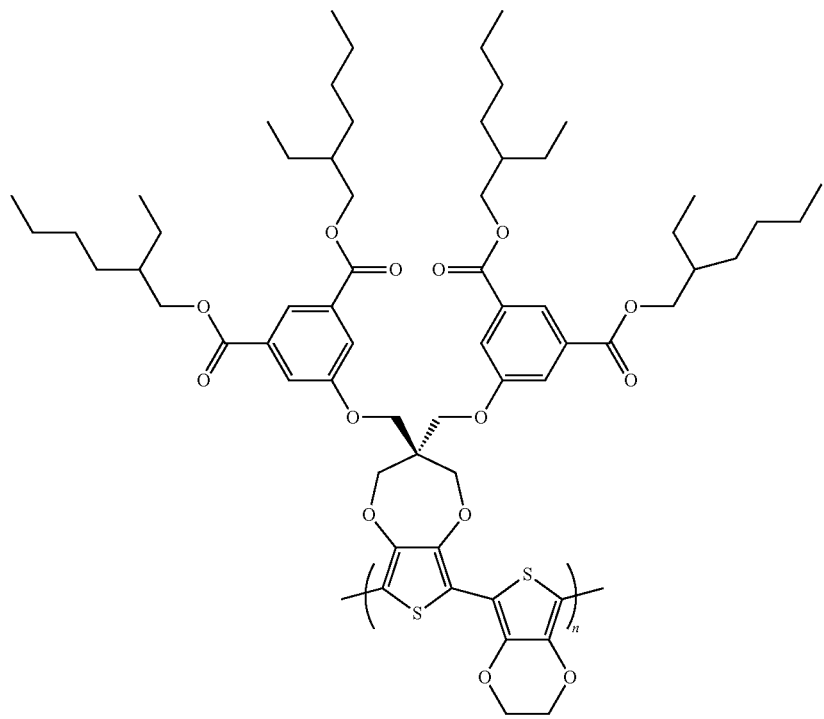

30

The presence of the hydrophobic solubilizing 2-ethylhexyl esters can provide for solubility in common nonpolar organic solvents. The hydrophobic solubilizing groups can be removed, e.g. via reaction with an organic or metal hydroxide, to yield the following polyelectrolyte structure

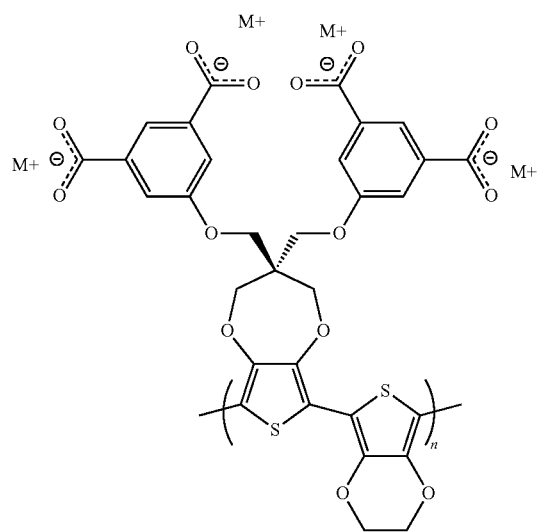

where M+ represents any metal or organic monovalent cation. The polyelectrolyte is readily soluble in water and other common polar solvents. The copolymer can therefore be made to be soluble in nonpolar solvents (by the presence of the hydrophobic solubilizing groups) and soluble in polar solvents (by removal of the hydrophobic solubilizing groups to form the polyelectrolyte form). The copolymer can therefore be processed from solution using a variety of solvents. Once the copolymer has been processed, e.g. to form a polymer film, layer, or other structure, the copolymer can then be rendered solvent resistant, e.g. insoluble in both common polar solvents and common nonpolar solvents. By treating the polyelectrolyte form of the copolymer with acid, the anionic conjugate base form of the acid groups are converted into the neutral acid form, yielding the following polymer structure

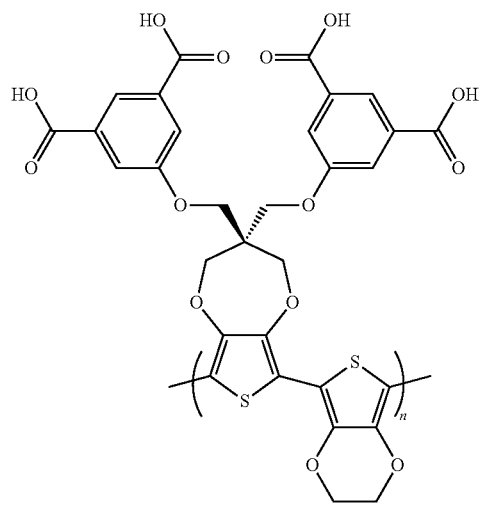

where the presence of hydrogen bonding can result in the polymer being insoluble in any common polar solvent or common nonpolar solvent, e.g. the copolymer can be insoluble in both water and chloroform.

In various aspects, processable copolymers are provided having a plurality of a first monomer unit containing acidic sidechains that can be interconverted between (i) ester forms to improve solubility in nonpolar organic solvents, (ii)

poly(electrolyte) forms to improve solubility in aqueous and polar solvents, and (neutral) acid forms to render the polymer solvent resistant or insoluble in water and common nonpolar solvents.

The copolymers can be made to have a variety of molecular weights depending upon the specific application. In various aspects, the copolymers have a molecular weight of about 5 kDa to 100 kDa, 5 kDa to 50 kDa, 10 kDa to 50 kDa, 10 kDa to 30 kDa, 10 kDa to 20 kDa, 20 kDa to 30 kDa, 15 kDa to 30 kDa, 15 kDa to 50 kDa, or about 15 kDa to 100 kDa. The copolymers can have a narrow mass distribution, e.g. a polydispersity index of about 1.5, 1.4, 1.3, 1.2, 1.1, or less.

By varying the structure of each monomer unit and/or by varying the number of each monomer unit in the copolymer, a variety of copolymers are provided herein having different electronic and optical properties. In various aspects, the copolymer contains 2, 3, 4, or 5 different types of monomer units.

The copolymers are capable of being processed in a large variety of solvents, offering several advantages in terms of film properties and casting techniques. The copolymers can, in one state, be soluble in organic or nonpolar solvents due to the number of hydrophobic solubilizing groups in the sidechains of the copolymer. For example, the conjugated copolymer can have a plurality of a first monomer subunit having one or more side chains containing an ester of an acid and a hydrophobic solubilizing group, wherein the hydrophobic solubilizing group can be removed to form a polyelectrolyte that is soluble in water and other polar solvents, and wherein the polyelectrolyte can be converted into the neutral acid state to render the copolymer solvent resistant.

In various aspects, conjugated copolymers are provided having a plurality of a first monomer subunit having one or more side chains that contain an ester of an acid and a hydrophobic solubilizing group, and a plurality of a second monomer subunit that does not have the ester side chains. In various aspects, the hydrophobic solubilizing group can be removed to leave the acid in the side chain as an anion or a salt thereof. The number of first monomer subunits in the conjugated copolymer can be at least the minimum number of first monomer subunits such that the conjugated copolymer is soluble in organic solvents but not in water. The number of first monomer subunits in the conjugated copolymer can be at least the minimum number of first monomer subunits such that the conjugated copolymer is soluble in polar solvents but not in non-polar solvents whenever the hydrophobic solubilizing group on each side chain has been removed to leave the acid in the side chain as the anion or salt thereof. In various aspects, conjugated copolymers are provided having a plurality of a first monomer subunit having one or more side chains containing the anionic conjugate base of an acid or a salt thereof and a plurality of a second monomer subunit that does not have the anionic conjugate base or salt thereof, wherein the number of first monomer subunits in the conjugated copolymer is at least the minimum number of first monomer subunits such that the conjugated copolymer is soluble in polar solvents but not in non-polar solvents. In various aspects, conjugated copolymers are provided having a plurality of a first monomer subunit having one or more side chains containing an acid and a plurality of a second monomer subunit that does not have the acid, wherein the number of first monomer subunits in the conjugated copolymer is at least the minimum number of first monomer subunits such that the conjugated copolymer solvent resistant. The acid can include a carboxylic acid, a thiocarboxylic acid, a dithiocarboxylic acid, a phosphonic acid, a boronic acid, or a combination thereof. In various aspects, the acid is a carboxylic acid and the anion is a carboxylate anion. The acid can be an aromatic carboxylic acid or an aromatic phosphonic acid.

In a variety of aspects, the first monomer subunit of the conjugated copolymer has a structure according to any one of the following formulas or a derivative thereof:

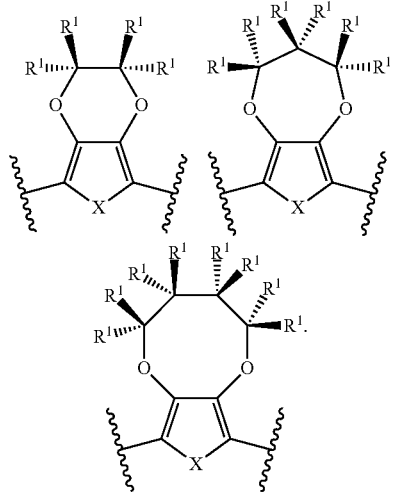

Each occurrence of $R^1$ can be independently a $R^4(CO_2R^5)_n$, H, or an alkyl sidechain, alkenyl side chain, alkynyl side chain, cycloalkyl side chain, heterocycloalkyl side chain, cycloalkenyl side chain, heterocycloalkenyl side chain, aryl side chain, heteroaryl side chain having from 1-30 carbon atoms, 2-30 carbon atoms, 3-30 carbon atoms, 3-25 carbon atoms, 3-20 carbon atoms, 4-20 carbon atoms, 4-18 carbon atoms, 6-18 carbon atoms, or 6-12 carbon atoms, optionally including one or more substituents. At least one, two, three, four, five, or six occurrences of $R^1$ should be $R^4(CO_2R^5)_n$. In some embodiments, $R^4$ is an alkyl, alkenyl, alkynyl, cycloalkyl, heterocycloalkyl, cycloalkenyl, heterocycloalkenyl, aryl, heteroaryl substituent having from 1-18 carbon atoms, 2-18 carbon atoms, 3-18 carbon atoms, 3-12 carbon atoms, or 4-12 carbon atoms, and optionally including one or more additional substituents. $R^5$ can include alkyl, heteroalkyl, alkenyl, alkynyl, cycloalkyl, heterocycloalkyl, cycloalkenyl, or heterocycloalkenyl groups having from 4-30 carbon atoms, 6 to 30 carbon atoms, 6-20 carbon atoms, 6-18 carbon atoms, or 12-18 carbon atoms, optionally including additional substituents. X can include S, Se, O, or NR, where R is a H, phenyl, benzyl, $C_1$-$C_{30}$ substituent, $C_1$-$C_{20}$ substituent, $C_3$-$C_{20}$ substituent, $C_3$-$C_{18}$ substituent, or $C_4$-$C_{12}$ substituent. In various embodiments, n is independently an integer from 1 to 6, 1 to 4, 2 to 4, or about 2, 3, 4, 5, or 6. In various aspects, each occurrence of $R^4$ is substituted or unsubstituted aryl, or substituted or unsubstituted heteroaryl; each occurrence of $R^5$ is substituted or unsubstituted $C_4$-$C_{30}$ alkyl, substituted or unsubstituted $C_4$-$C_{30}$ heteroalkyl, substituted or unsubstituted $C_4$-$C_{30}$ cycloalkyl, or substituted or unsubstituted $C_4$-$C_{30}$ heterocycloalkyl, and at least two occurrences of $R^1$ have the structure $R^4(CO_2R^5)_n$.

In various aspects, conjugated copolymers are provided, wherein the first monomer subunit has a structure according to according to any one of the following formulas or a derivative thereof:

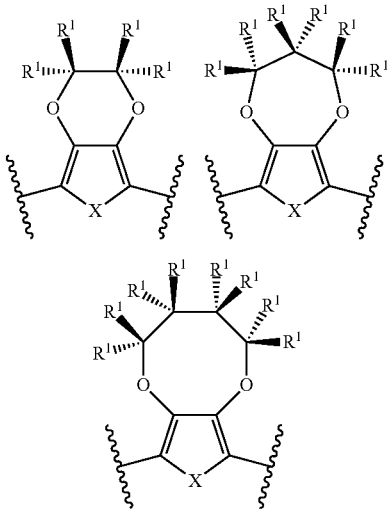

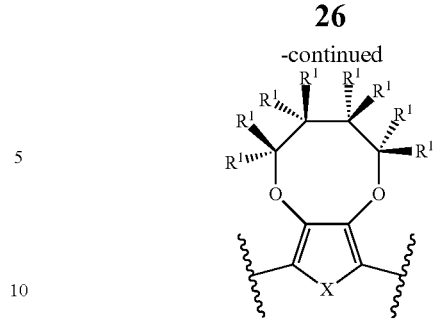

wherein each occurrence of $R^1$ is independently selected from the group $C_1$-$C_{30}$ carboxylic acids, $C_1$-$C_{30}$ thiocarboxylic acids, $C_1$-$C_{30}$ dithiocarboxylic acids, $C_1$-$C_{30}$ phosphonic acids, $C_1$-$C_{30}$ boronic acids, H, or an alkyl sidechain, alkenyl side chain, alkynyl side chain, cycloalkyl side chain, heterocycloalkyl side chain, cycloalkenyl side chain, heterocycloalkenyl side chain, aryl side chain, heteroaryl side chain having from 1-30 carbon atoms, 2-30 carbon atoms, 3-30 carbon atoms, 3-25 carbon atoms, 3-20 carbon atoms, 4-20 carbon atoms, 4-18 carbon atoms, 6-18 carbon atoms, or 6-12 carbon atoms, optionally including one or more substituents, so long as at least one, two, three, four, five, or six occurrences of $R^1$ are a $C_1$-$C_{30}$ carboxylic acid, $C_1$-$C_{30}$ thiocarboxylic acid, $C_1$-$C_{30}$ dithiocarboxylic acid, $C_1$-$C_{30}$ phosphonic acid, or a $C_1$-$C_{30}$ boronic acid. X can include S, Se, O, or NR, where R is a H, phenyl, benzyl, $C_1$-$C_{30}$ substituent, $C_1$-$C_{20}$ substituent, $C_3$-$C_{20}$ substituent, $C_3$-$C_{18}$ substituent, or $C_4$-$C_{12}$ substituent. In various embodiments, p is independently an integer from 1 to 6, 1 to 4, 2 to 4, or about 2, 3, 4, 5, or 6. In various aspects, the $R^1$ are independently selected from the group consisting of substituted and unsubstituted $C_1$-$C_{30}$ aromatic carboxylic acids and substituted and unsubstituted $C_1$-$C_{30}$ aromatic phosphonic acids. In some embodiments, at least two occurrences of $R^1$ are aromatic carboxylic acids.

wherein each occurrence of $R^1$ is independently $R^9(CO_2^-)_p$, H, or an alkyl sidechain, alkenyl side chain, alkynyl side chain, cycloalkyl side chain, heterocycloalkyl side chain, cycloalkenyl side chain, heterocycloalkenyl side chain, aryl side chain, heteroaryl side chain having from 1-30 carbon atoms, 2-30 carbon atoms, 3-30 carbon atoms, 3-25 carbon atoms, 3-20 carbon atoms, 4-20 carbon atoms, 4-18 carbon atoms, 6-18 carbon atoms, or 6-12 carbon atoms, optionally including one or more substituents, so long as at least one, two, three, four, five, or six occurrences of $R^1$ are $R^9(CO_2^-)_p$. In various aspects, each occurrence of $R^9$ is an alkyl, alkenyl, alkynyl, cycloalkyl, heterocycloalkyl, cycloalkenyl, heterocycloalkenyl, aryl, heteroaryl substituent having from 1-18 carbon atoms, 2-18 carbon atoms, 3-18 carbon atoms, 3-12 carbon atoms, or 4-12 carbon atoms, and optionally including one or more additional substituents. X can include S, Se, O, or NR, where R is a H, phenyl, benzyl, $C_1$-$C_{30}$ substituent, $C_1$-$C_{20}$ substituent, $C_3$-$C_{20}$ substituent, $C_3$-$C_{18}$ substituent, or $C_4$-$C_{12}$ substituent. In various embodiments, p is independently an integer from 1 to 6, 1 to 4, 2 to 4, or about 2, 3, 4, 5, or 6. In various embodiments, $R^9$ is a substituted or unsubstituted aryl, or a substituted or unsubstituted heteroaryl, wherein at least two occurrences of $R^1$ have the structure $R^9(CO_2^-)_p$.

In various embodiments, conjugated copolymers are provided, wherein the first monomer subunit has a structure according any one of the following formulas or a derivative thereof:

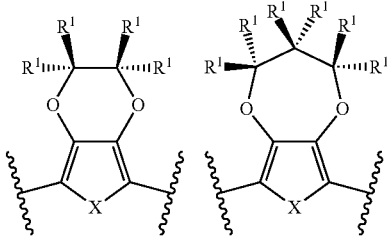

In various aspects, conjugated copolymers are provided having a structure according to the following formula or a derivative thereof

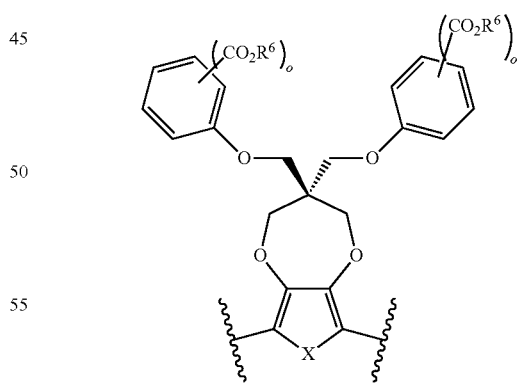

wherein each occurrence of $R^6$ can be an alkyl, heteroalkyl, alkenyl, alkynyl, cycloalkyl, heterocycloalkyl, cycloalkenyl, or heterocycloalkenyl group having from 4-30 carbon atoms, 6-30 carbon atoms, 6-20 carbon atoms, 6-18 carbon atoms, or 12-18 carbon atoms, optionally including additional substituents. X can include S, Se, O, or NR, where R is a H, phenyl, benzyl, $C_1$-$C_{30}$ substituent, $C_1$-$C_{20}$ substituent, $C_3$-$C_{20}$ substituent, $C_3$-$C_{18}$ substituent, or $C_4$-$C_{12}$ substituent. In various embodiments, o is independently an integer from 1 to 5, 1 to 4, 2 to 4, or about 2, 3, 4, or 5.

In a variety of embodiments, conjugated copolymers are provided, wherein the first monomer subunit has a structure according to the following formula or a salt or derivative thereof

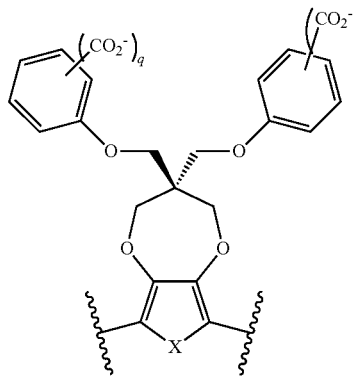

X can include S, Se, O, or NR, where R is a H, phenyl, benzyl, $C_1$-$C_{30}$ substituent, $C_1$-$C_{20}$ substituent, $C_3$-$C_{20}$ substituent, $C_3$-$C_{18}$ substituent, or $C_4$-$C_{12}$ substituent. In various embodiments, q is independently an integer from 1 to 5, 1 to 4, 2 to 4, or about 2, 3, 4, or 5. Suitable salts can include sodium, potassium, or lithium salts as examples.

In some embodiments, conjugated copolymers are provided wherein the first monomer subunit has a structure according to the following formula or a derivative thereof

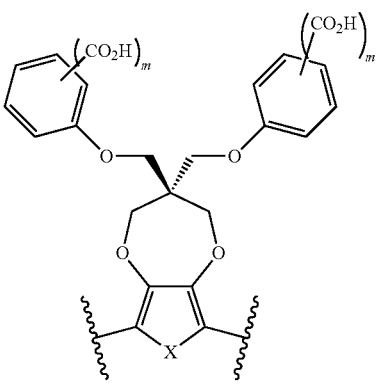

X can include S, Se, O, or NR, where R is a H, phenyl, benzyl, $C_1$-$C_{30}$ substituent, $C_1$-$C_{20}$ substituent, $C_3$-$C_{20}$ substituent, $C_3$-$C_{18}$ substituent, or $C_4$-$C_{12}$ substituent. In various embodiments, m is independently an integer from 1 to 5, 1 to 4, 2 to 4, or about 2, 3, 4, or 5.

In a variety of embodiments, the conjugated copolymers have repeat units having a structure selected from the group consisting of A-B, A-B-B, A-B-B-B, A-B-B-B-B, A-A-B, and A-A-B-B. In various aspects, B represents the second monomer subunit and has a structure selected from the group consisting of structures according to Formula 1B, Formula 2B, Formula 3B, Formula 4B, Formula 5B, Formula 6B, and derivatives thereof

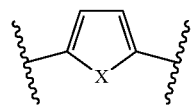

Formula 1B

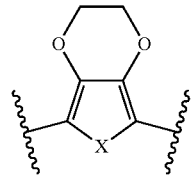

Formula 2B

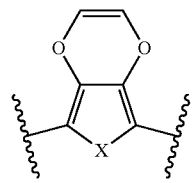

Formula 3B

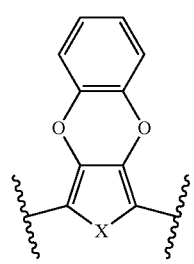

Formula 4B

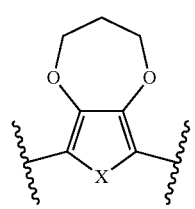

Formula 5B

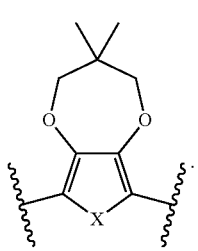

Formula 6B

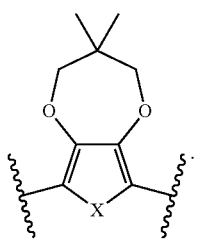

In various aspects, each occurrence of X is independently S, Se, O, or NR, where R is a H, phenyl, benzyl, or $C_1$-$C_{30}$ substituent. In some embodiments, In some aspects, A represents the first monomer subunit and has a structure according to Formula 7A or a derivative thereof;

Formula 7A

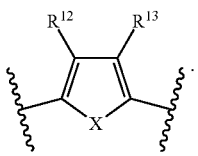

wherein each occurrence of $R^{12}$ is the anionic conjugate base of an acid such as substituted and unsubstituted carboxylic acids, di-carboxylic acids, tri-carboxylic acids, having from 2-30, 4-30, 4-20, 4-18, 6-18, or 6-12 carbon atoms, or a derivative thereof, and each occurrence of $R^{13}$ is independently selected from the group consisting of hydrogen, substituted and unsubstituted $C_1$-$C_{30}$ alkyl, substituted and unsubstituted $C_2$-$C_{30}$ alkenyl, substituted and unsubstituted $C_2$-$C_{30}$ alkynyl, substituted and unsubstituted $C_3$-$C_{30}$ cycloalkyl, substituted and unsubstituted $C_1$-$C_{30}$ heterocycloalkyl, substituted and unsubstituted $C_3$-$C_{30}$ cycloalkenyl, substituted and unsubstituted $C_1$-$C_{30}$ heterocycloalkenyl, substituted and unsubstituted aryl, and substituted and unsubstituted heteroaryl, and the anionic conjugate base of an acid independently selected from the group consisting of substituted and unsubstituted $C_2$-$C_{30}$ carboxylic acids, substituted and unsubstituted $C_2$-$C_{30}$ di-carboxylic acids, substituted and unsubstituted $C_2$-$C_{30}$ tri-carboxylic acids, and derivatives thereof; or wherein each occurrence of $R^{12}$ and $R^{13}$, when taken together and with the atoms to which they are attached, are selected from the group consisting of substituted and unsubstituted $C_6$-$C_{40}$ cycloalkyl, heterocycloalkyl, cycloalkenyl, heterocycloalkenyl, aryl, and heteraryl groups having from 1 to 6 anionic acid substituents.

In certain aspects, A represents the first monomer subunit and has a structure according to Formula 1A or a derivative thereof;

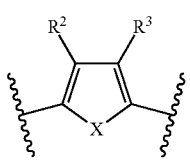

Formula 1A wherein each occurrence of $R^2$ is independently selected from the group consisting of substituted and unsubstituted carboxylic acids, thiocarboxylic acids, dithiocarboxylic acids, phosphonic acids, boronic acids, each having from 2 from 2-30, 4-30, 4-20, 4-18, 6-18, or 6-12 carbon atoms, and a combination thereof, and each occurrence of $R^3$ is independently selected from the group consisting of hydrogen, substituted and unsubstituted $C_1$-$C_{30}$ alkyl, substituted and unsubstituted $C_2$-$C_{30}$ alkenyl, substituted and unsubstituted $C_2$-$C_{30}$ alkynyl, substituted and unsubstituted $C_3$-$C_{30}$ cycloalkyl, substituted and unsubstituted $C_1$-$C_{30}$ heterocycloalkyl, substituted and unsubstituted $C_3$-$C_{30}$ cycloalkenyl, substituted and unsubstituted $C_1$-$C_{30}$ heterocycloalkenyl, substituted and unsubstituted aryl, and substituted and unsubstituted heteroaryl, substituted and unsubstituted $C_2$-$C_{30}$ carboxylic acids, substituted and unsubstituted $C_2$-$C_{30}$ thiocarboxylic acids, substituted and unsubstituted $C_2$-$C_{30}$ dithiocarboxylic acids, substituted and unsubstituted $C_2$-$C_{30}$ phosphonic acids, substituted and unsubstituted $C_2$-$C_{30}$ boronic acids, and a combination thereof; or wherein each occurrence of $R^2$ and $R^3$, when taken together and with the atoms to which they are attached, are selected from the group consisting of substituted and unsubstituted $C_6$-$C_{40}$ cycloalkyl, heterocycloalkyl, cycloalkenyl, heterocycloalkenyl, aryl, and heteraryl groups having from 1 to 6 acid substituents independently selected from the group consisting of carboxylic acids, thiocarboxylic acids, dithiocarboxylic acids, phosphonic acids, and boronic acids.

The conjugated copolymer can be soluble in nonpolar organic solvents. A variety of common nonpolar organic solvents include benzene, carbon tetrachloride, chloroform, cyclohexane, toluene, and mixtures thereof. In various aspects, the conjugated copolymer includes a plurality of a first monomer subunit having one or more side chains having an ester of an acid and a hydrophobic solubilizing group. The acid can be a carboxylic acid, thiocarboxylic acid, dithiocarboxylic acid, phosphonic acid, boronic acid, or a combination thereof. In various aspects, the hydrophobic solubilizing group can be removed to leave the acid in the side chain as an anion or a salt thereof. In various aspects, the acid is a carboxylic acid and the anion is a carboxylate anion.

The conjugated copolymer can further include a plurality of a second monomer subunit that does not have the ester side chains. The second monomer subunit can include any aromatic monomer unit commonly used in conjugated polymers, e.g. the second monomer unit can include thiophene, furan, xylene, or other monomer units, optionally include one or more sidechains but without the ester groups.

In various aspects, by removing the hydrophobic solubilizing groups, the copolymer can be made to be soluble in aqueous solvents or other polar solvents. In this state, the copolymer can have a plurality of a first monomer subunit having one or more side chains containing the anionic conjugate base of an acid or a salt thereof. The acid can be the acid is a a carboxylic acid, thiocarboxylic acid, dithiocarboxylic acid, phosphonic acid, boronic acid, or any combination thereof. In various aspects, the acid is an aromatic carboxylic acid or an aromatic phosphonic acid acid. In various aspects, number of first monomer subunits in the conjugated copolymer is at least the minimum number of first monomer subunits such that the conjugated copolymer is soluble in polar solvents but not in non-polar solvents. In various aspects, the number of first monomer subunits present in the conjugated copolymer is about 20% to 80%, about 20% to 50%, or about 20% to 40% of the total number of monomer subunits in the copolymer. In various aspects, the first monomer subunit is present in an amount from about 30% (w/w) to 90% (w/w), about 30% (w/w) to 60% (w/w), or about 30% (w/w) to 50% (w/w) based upon the average weight of the polymer.

Methods of Making Processable Polymers

A variety of methods are provided for making the copolymers described herein. In some aspects, the methods include direct arylation polymerization of the repeat units to form the copolymers, e.g. as described in US 2014/0371409 A1, the contents of which are incorporated herein in their entirety. In short, monomer units can be synthesized, wherein one of the aromatic rings has a leaving group for the direct arylation reaction, e.g. Br. A suitable catalyst can include Pd(OAc)2, with a proton shuttle such as pivalic acid and a base such as $K_2CO_3$. Suitable solvents can include nonpolar solvents such as dimethylacetamide. The resulting polymers can be purified using known techniques of polymer purification, e.g. via Soxhlet extraction using a variety of nonpolar solvents.

The skilled artisan, upon viewing the copolymers described herein, may envision additional methods of making such polymers. In various aspects, the copolymer can be made via Stille coupling, Suzuki coupling, or Grignard metathesis (GRIM) methods.

Electrodes, Electrchromic Devices, and Methods of Making Thereof

Methods of making electrodes from the conjugated copolymers are also provided. The methods can include casting the polymer from a variety of solvents and under a variety of conditions. The casting step can include a method selected from the group consisting of drop casting, dip coating, spin coating, blade coating, spray coating, inkjet printing, gravure printing, roll coating, and a combination thereof. The methods can be used to cast the conjugated copolymer on a variety of substrates. In various aspects, the layer of the conjugated copolymer has an average thickness of about 100 nm to about 2.5 µm.

Methods of casting from a polar solvent can include (a) casting a solution containing a conjugated copolymer and a polar solvent onto a surface of a substrate to form a film, wherein the conjugated copolymer has a plurality of a first monomer subunit having one or more side chains containing an anionic conjugate base of an acid or a salt thereof and a plurality of a second monomer subunit that does not have the anionic conjugate base, and wherein the number of first monomer subunits in the conjugated copolymer is at least the minimum number of first monomer subunits such that the conjugated copolymer is soluble in the polar solvent; (b) treating the film having the conjugated copolymer with an acid to convert the anionic conjugate base into the acid form to produce the electrode having a layer of the conjugated copolymer on the surface of the substrate; wherein the number of first monomer subunits in the conjugated copolymer is at least the minimum number of first monomer subunits such that the conjugated copolymer is solvent resistant. Suitable polar solvents can include water, methanol, ethanol, isopropanol, dimethylformamide, dimethylacetamide, dimethylsulfoxide, and mixtures thereof.

Methods of casting from nonpolar organic solvents can include (a) casting a solution having a conjugated copolymer and a nonpolar solvent onto a surface of a substrate to form a film, wherein the conjugated copolymer has a plurality of a first monomer subunit having one or more side chains containing an ester of an acid and a hydrophobic solubilizing group and a plurality of a second monomer subunit that does not have the ester, and wherein the number of first monomer subunits in the conjugated copolymer is at least the minimum number of first monomer subunits such that the conjugated copolymer is soluble in the nonpolar solvent; (b) treating the film having the conjugated copolymer with a hydroxide to convert the ester into an anionic conjugate base of the acid or a salt thereof; and (c) treating the film with an acid to convert the anionic conjugate base into the acid form to produce the electrode having a layer of the conjugated copolymer on the surface of the substrate; wherein the number of first monomer subunits in the conjugated copolymer is at least the minimum number of first monomer subunits such that the conjugated copolymer is solvent resistant. Suitable nonpolar solvents can include chloroform, xylene, toluene, dimethyl benzene, and mixtures thereof.

In various aspects, the second monomer subunits have an oxidation potential lower than or equal to the oxidation potential of the first monomer subunits, and the number of second monomer subunits in the conjugated copolymer is at least the minimum number of second monomer subunits to lower the oxidation onset of the conjugated copolymer as compared to the oxidation onset of the otherwise same polymer except without the second monomer subunits when measured under the same conditions.

A variety of electrodes and electrochemical devices made therefrom are also provided. The electrode can include a conducting substrate and a layer of a conjugated copolymer, wherein the conjugated copolymer has a plurality of a first monomer subunit having one or more acid side chains and a plurality of a second monomer subunit that does not have the acid side chains, wherein the number of first monomer subunits in the conjugated copolymer is at least the minimum number of first monomer subunits such that the conjugated copolymer is solvent resistant. The conjugated copolymer can be any of the solvent resistant copolymers provided herein.

The conducting substrate can be a conducting plastic substrate, conducting paper substrate, a conducting textile substrate, conducting cellulose substrate, a carbon nanotube substrate, a graphite or graphene substrate, a carbon foam substrate, a metal substrate, a metal oxide substrate, or a conductive polymer substrate. The mass loading of the conjugated copolymer onto the substrate can be about 20% to 200% (w/w/) based upon the weight of the substrate. In various aspects, the layer of the conjugated copolymer can have an average thickness of about 100 nm to 2.5 µm.

A variety of supercapacitors and electrochemical devices are provided including one of the electrodes. In some regards, the supercapacitor includes two electrodes in contact with an electrolyte, wherein at least one of the electrodes has a structure described herein. A variety of electrolytes can be employed with the solvent resistant polymers described herein. The electrolyte can include an organic electrolyte, an aqueous electrolyte, a biological electrolyte, a solid state electrolyte, or a combination thereof. The electrolyte can be an aqueous salt solution or an organic salt solution having a salt selected from the group sodium chloride, potassium chloride, tetrabutylammonium hexafluorophosphate (TBAPF6), and lithium bis(trifluoromethylsulfonyl)imide (LiBTI).

In some aspects, supercapacitors are provided where both electrodes have a solvent resistant structure described herein. The supercapacitor can be a symmetrical device having the electrolyte between the two electrodes. In some embodiments, the supercapacitor is an asymmetrical supercapacitor and each of the electrodes contains a different conducting substrate from the other electrode. In some aspects, the supercapacitor is an asymmetrical supercapacitor and each of the electrodes contains a different conjugated copolymer from the other electrode. In some embodiments, the supercapacitor is an asymmetrical supercapacitor, wherein only one of the electrodes has a solvent resistant structure described herein.

A variety of additional electrochemical devices are provided using these electrodes, including supercapacitors and electrochromic devices.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

The polymers described in these examples (see FIG. 1), are initially in their ester form and soluble in organic solvents (left structure) but can be rendered water-soluble through defunctionalization of the alkoxy-chains (middle structure) with an organic or metal hydroxide. In addition to water, the polyelectrolyte form is highly soluble in other polar solvents such as DMF but insoluble in relatively non-polar solvents (such as chloroform). The water-soluble, polyelectrolyte form of these polymers can be cast into thin films using a using a variety of processing methods. These polyelectrolyte films can then be further treated with acid to render them solvent resistant (right structure) making them compatible and highly electroactive in both organic and aqueous electrolyte systems. The organic soluble polymers were synthesized using a direct arylation polymerization and can also be synthesized via Stille, Suzuki, or GRIM methods (see FIG. 3)

Figure 4A:
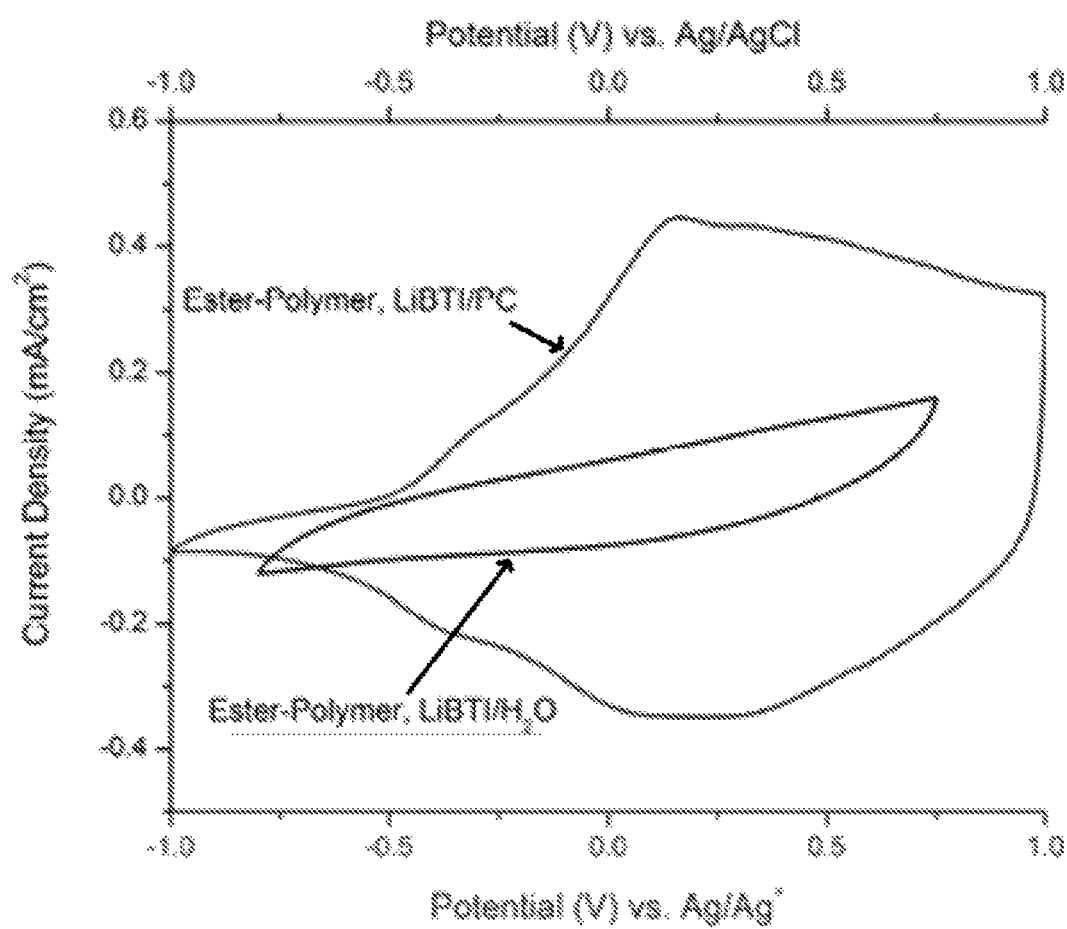
FIG. 4A Cycling voltammogram showing the organic soluble ProDOT-EDOT copolymer in an organic (propylene carbonate) based electrolyte, and an aqueous electrolyte.
Figure 4B:
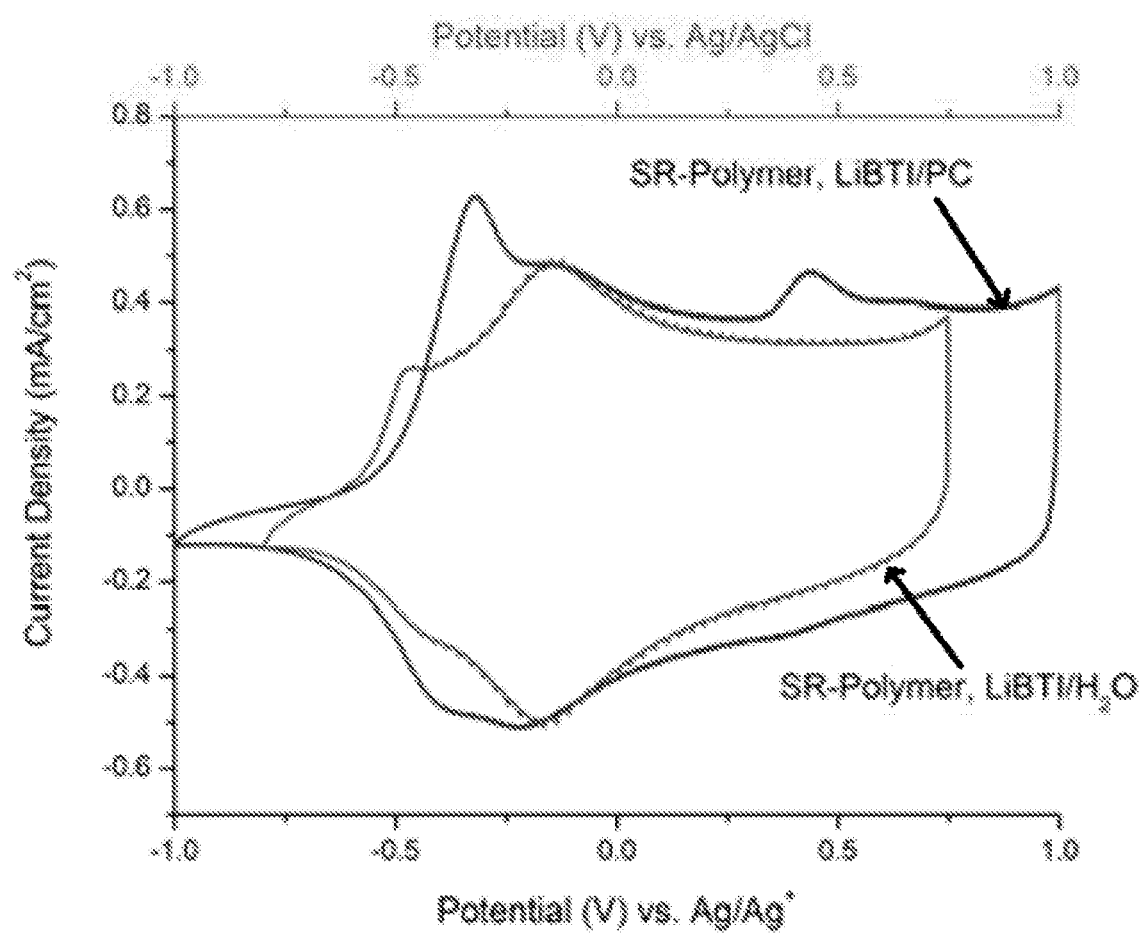
FIG. 4B Cycling voltammogram showing the solvent resistant ProDOT-EDOT copolymer in an organic (propylene carbonate) based electrolyte, and an aqueous electrolyte.
Figure 5A:
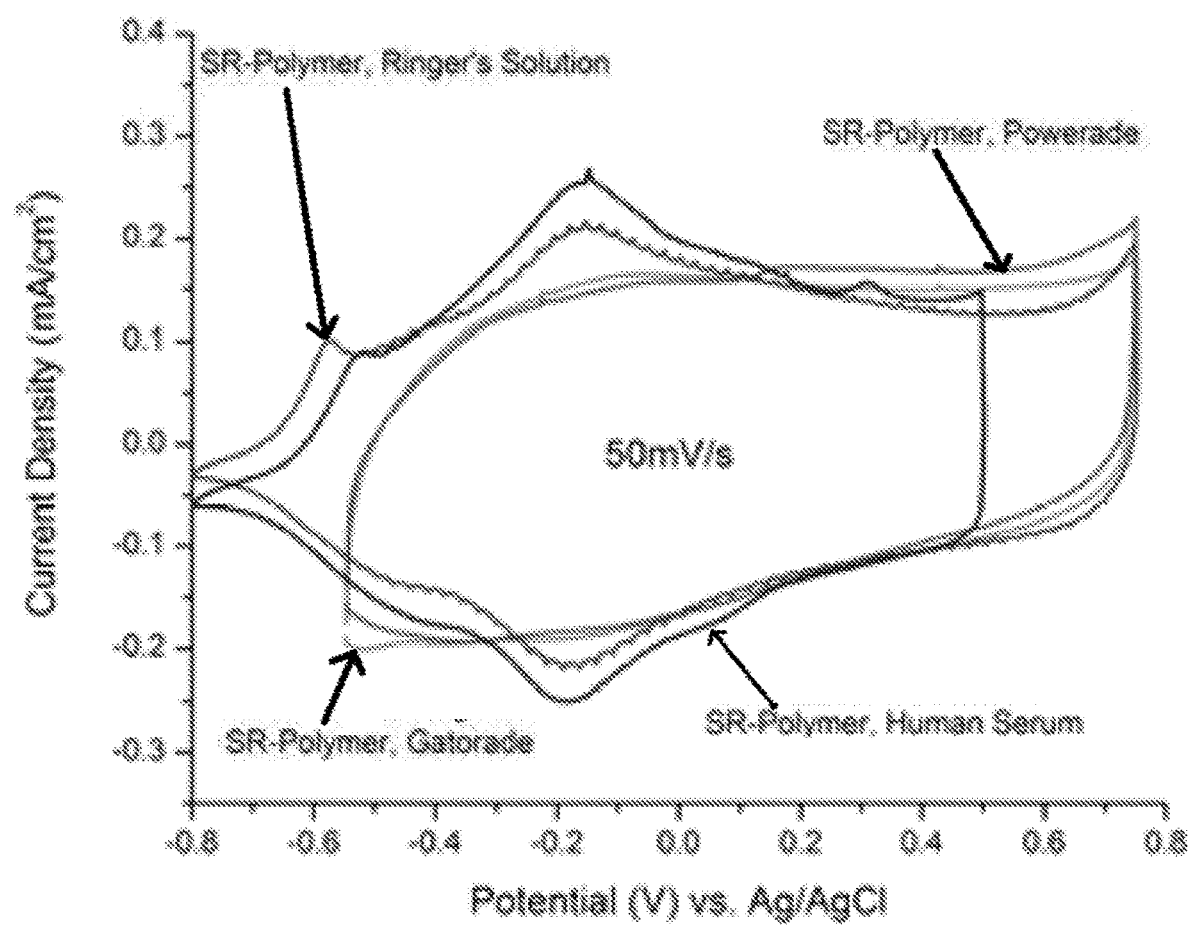
FIG. 5A Cyclic voltammogram showing the solvent resistant ProDOT-EDOT copolymer in various biologically relevant electrolyte solutions.
Figure 5B:
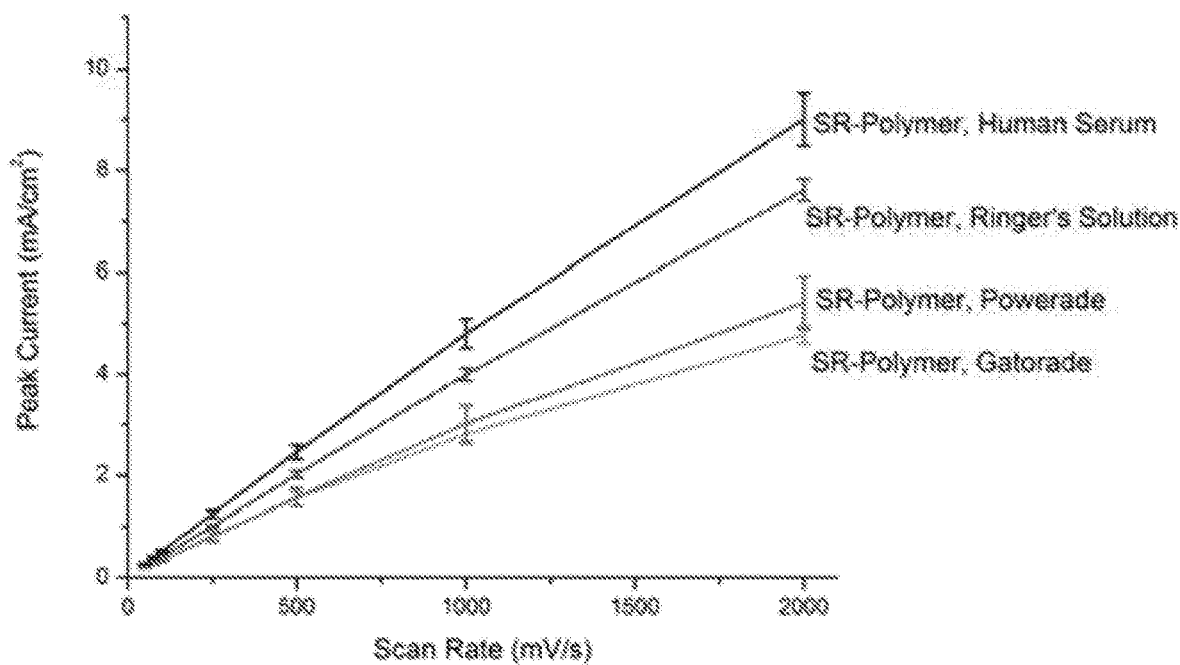
FIG. 5B Peak current from cyclic voltammetry versus scan rate for solvent resistant ProDOT-EDOT copolymer in various biologically relevant electrolyte solutions.
Figure 5C:
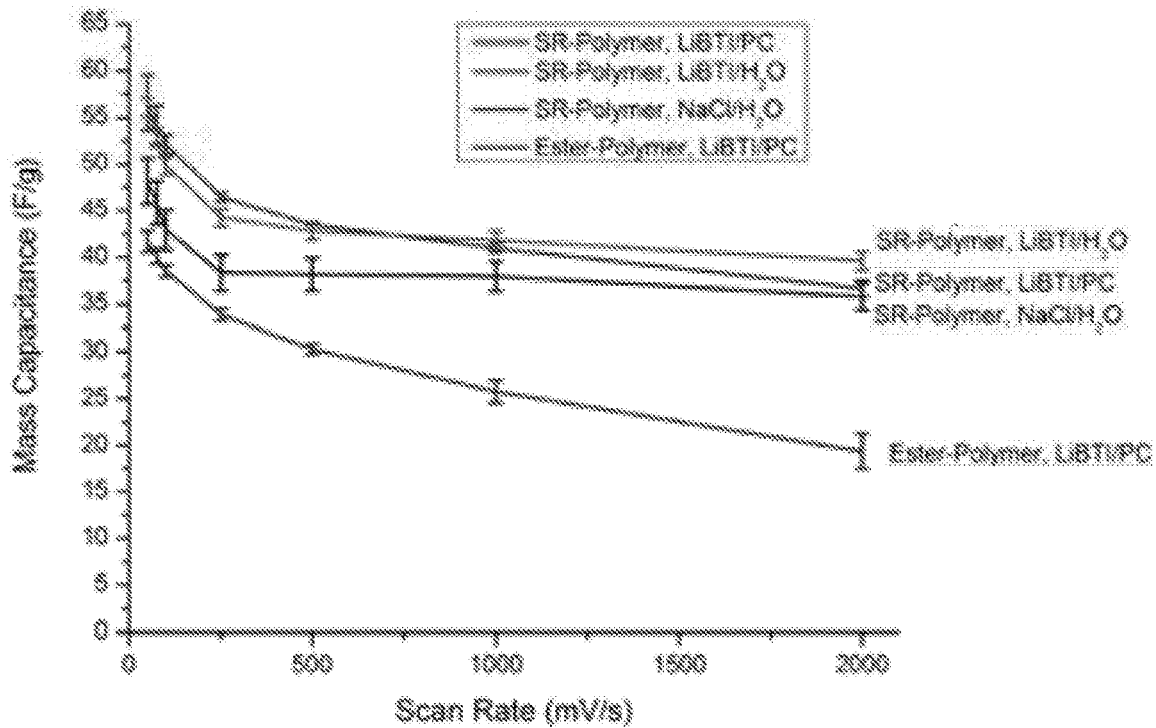
FIG. 5C Mass capacitance versus scan rate for solvent resistant and organic soluble ProDOT-EDOT copolymer in aqueous and propylene carbonate based electrolytes.
Figure 5D:
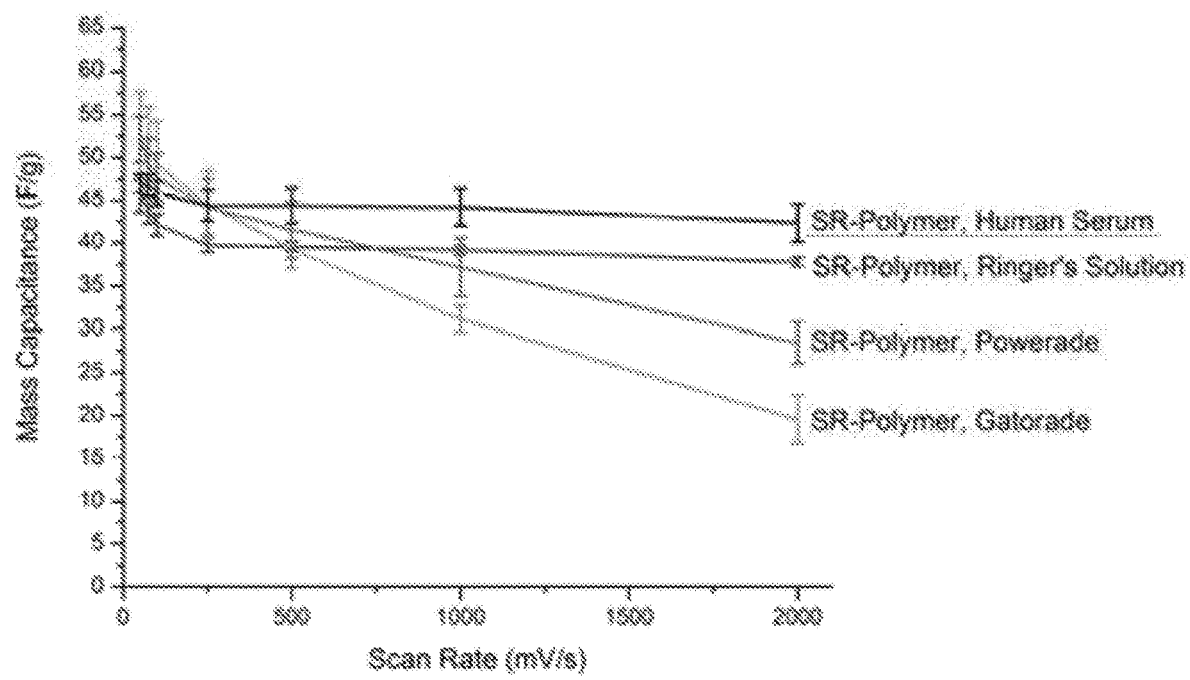
FIG. 5D Mass capacitance versus scan rate for solvent resistant and organic soluble ProDOT-EDOT copolymer in various biologically relevant electrolytes.

As exemplified in FIG. 4A by poly(ProDOT-EDOT), the organic soluble polymers/ester-form of these polymers exhibit redox switching in organic electrolytes but not in aqueous electrolyte systems. By converting these polymers to a solvent resistant form they are able to demonstrate similar redox behavior in both organic and aqueous electrolyte systems, as shown in FIG. 4B.

There is little observed change in the onset of oxidation, peak oxidation potential, or magnitude of the peak current when changing between various organic and aqueous electrolytes. Furthermore, these solvent resistant systems demonstrate less resistive behavior at higher scan rates relative to the corresponding organic soluble polymer. Environmentally benign electrolytes such as NaCl in water are equally effective as toxic organic electrolytes at rapid redox switching of the solvent resistant polymer films.

A variety of electrolytes and sports drinks are also usable electrolytes. Biological electrolytes, such as Ringer's solution and human serum (blood), perform on par with NaCl and LiBTI as excellent electrolytes at slow and rapid scan rates up to several volts per second. The solvent resistant forms not only allow for the use of both aqueous and organic electrolytes, they also possess higher film capacitances than their organic soluble counterparts, and are able to retain a high level of capacitance even at fast charge/discharge rates (<0.5 sec).

Figure 6A:
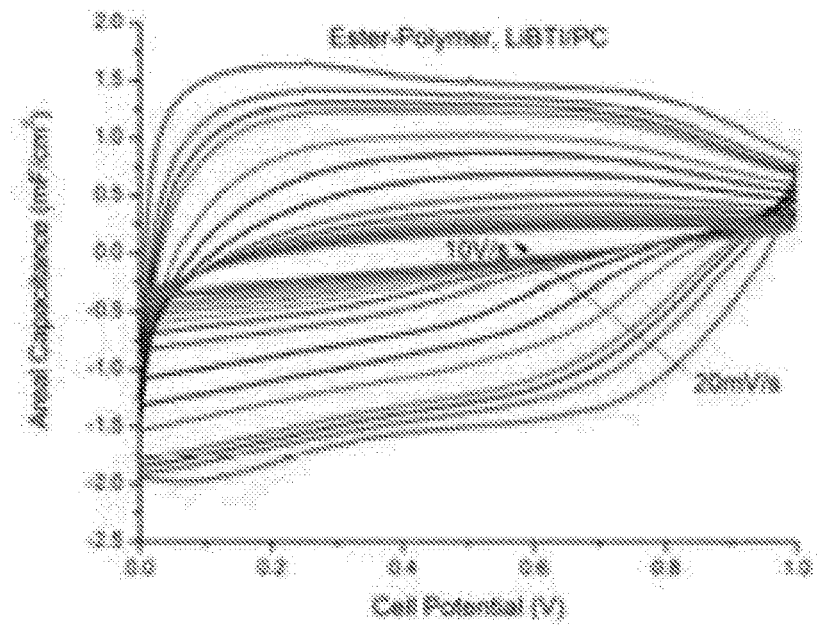
FIGS. 6A-6C Areal capacitance as a function of cell voltage for various scan rates from 20 mV/s to 10 V/s of supercapacitor devices incorporating organic soluble ProDOT-EDOT in LiBTI salt in propylene carbonate electrolye (FIG. 6A), solvent resistant ProDOT-EDOT in LiBTI salt in aqueous electrolyte (FIG. 6B), and the solvent resistant ProDOT-EDOT in NaCl salt in aqueous electrolyte (FIG. 6C).
Figure 6B:
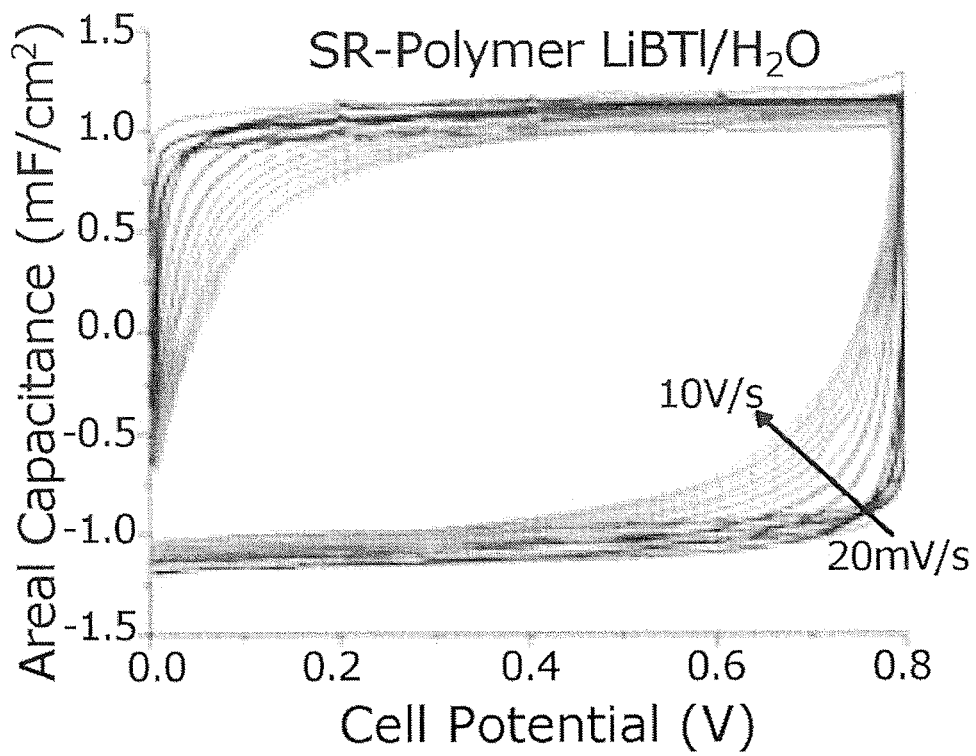
Figure 6C:
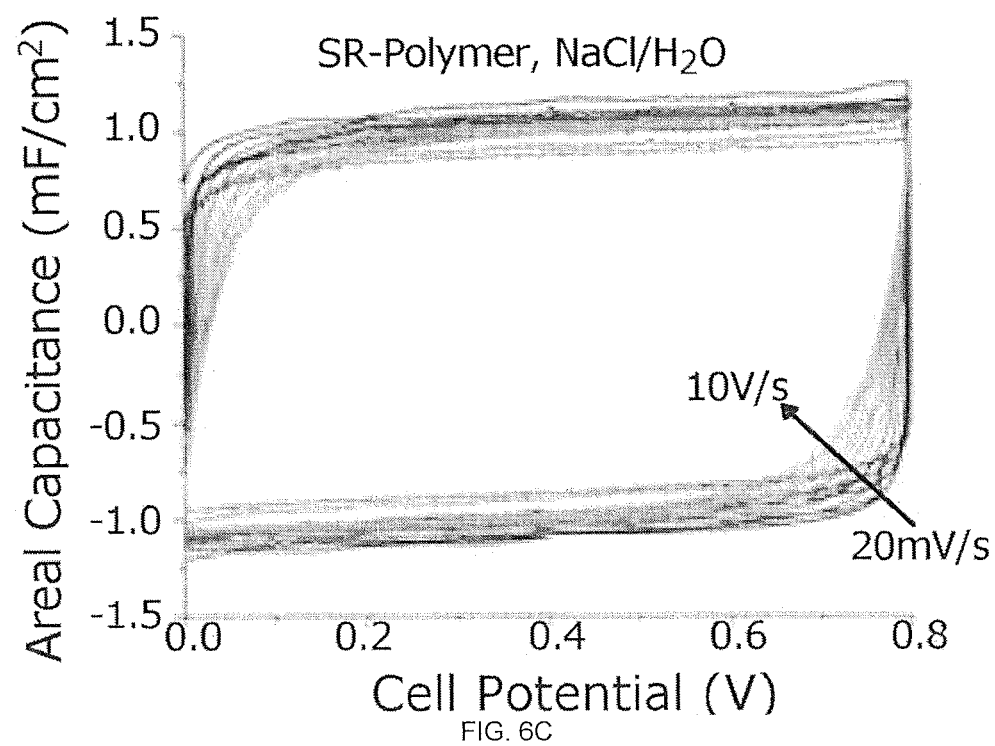

Supercapacitor devices composed of the organic soluble/ester-form of poly(ProDOT-EDOT) (FIG. 6A) exhibit capacitive behavior and high fill factors (defined as the ratio of the actual charge passed during device operation to the charge passed under ideal device behavior and quantifies the deviation from ideal charge/discharge behavior) at scan rates up to ZS0mV fs (discharge time: <4 sec) but perform poorly at faster discharge rates, Solvent resistant (FIG. 6B and FIG. 6C) poly(ProDOT-EDOT) devices maintain high fill factor and close to ideal capacitive behavior at scan rates as high as IOV js (discharge time: 0.08 sec).

Figure 7:
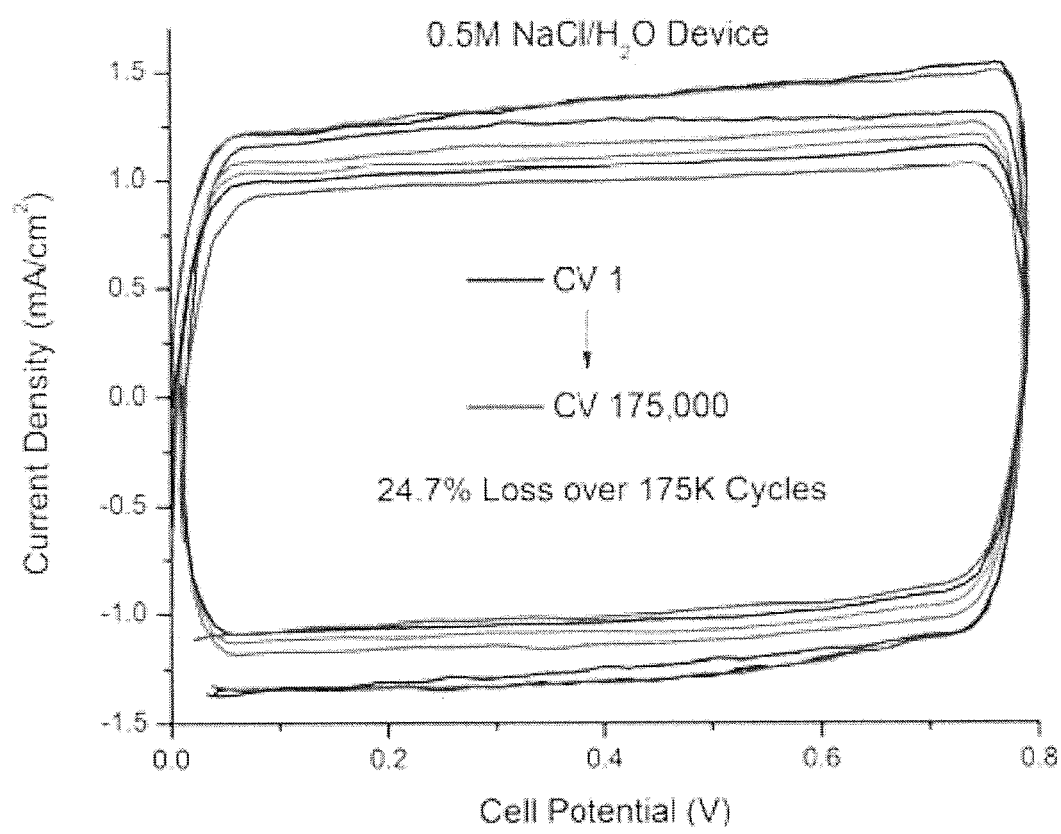
FIG. 7 Cycling stability of supercapacitor device incorporating solvent resistant ProDOT-EDOT over 175,000 charge-discharge cycles.

Poly(ProDOT-EDOT) devices with NaCl/HzO as the electrolyte are stable to repeated cycling without encapsulation. Only a 24.7% reduction in capacitance is observed after 175,000 cycles at 1000 mV per sec (FIG. 7).

Figure 8A:
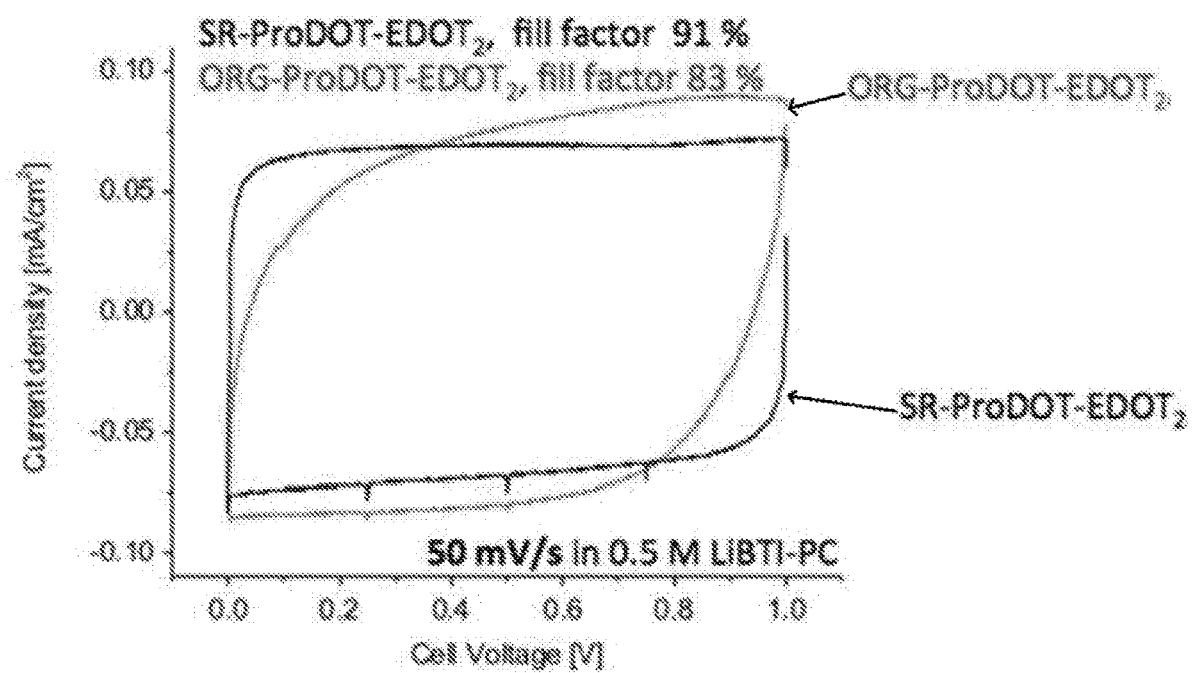
FIGS. 8A-8B Cyclic voltammogram of supercapacitor device incorporating solvent resistant and organic soluble polymer in LiBTI-propylene carbonate electrolyte demonstrating enhanced fill factor (switching speed) of the solvent resistant copolymer at 50 mV/s scan rate (FIG. 8A). Cyclic voltammograms and corresponding fill factor of supercapacitor device incorporating solvent resistant XXX at various potential windows from 0.8V to 1.6V in LiBTI-propylene carbonate electrolyte (FIG. 8B).
Figure 8B:
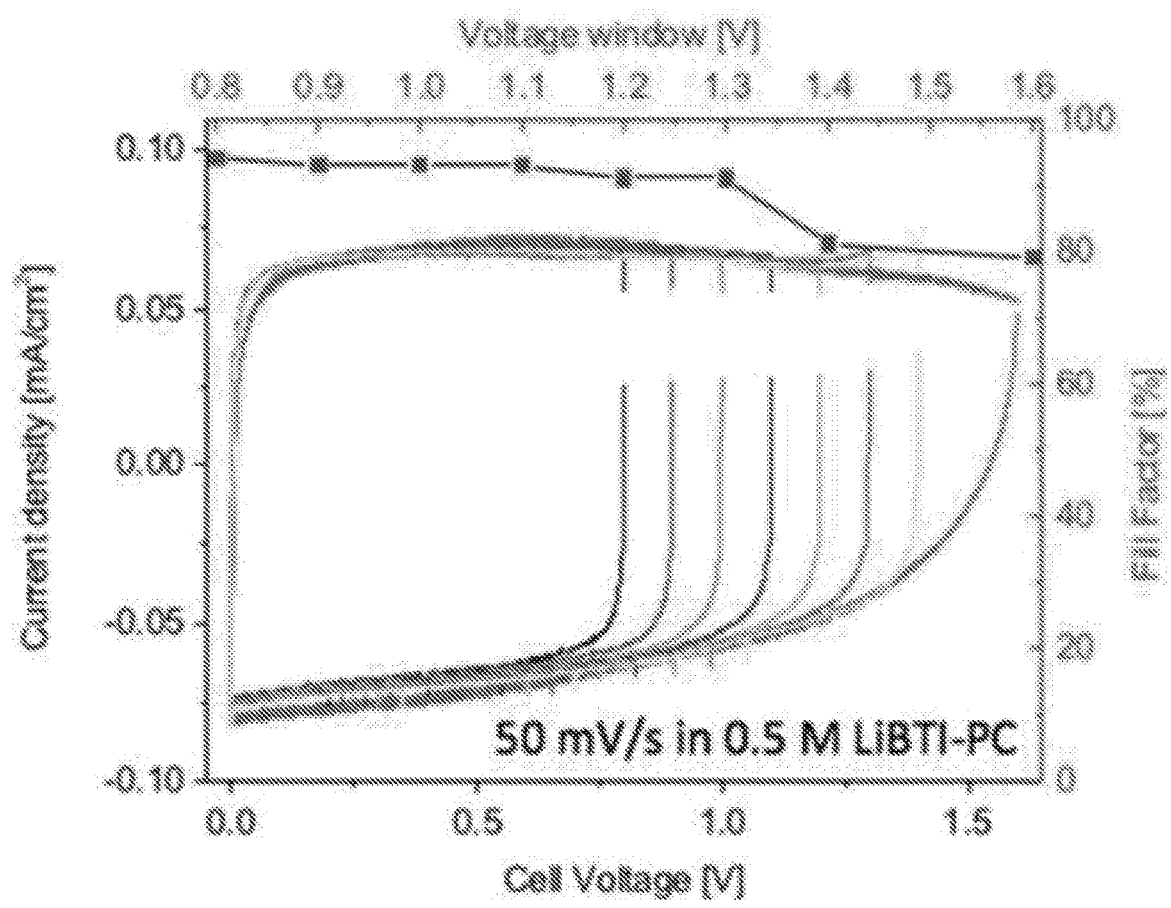

In comparing supercapacitor devices of solvent resistant poly(ProDOT-EDOTz) and an organic soluble analog (ORG-ProDOT-EDOT$_2$ in FIGS. 8A-8B), the solvent resistant form (SR-ProDOT-EDOT$_2$ in FIGS. 8A-8B) exhibits a more capacitive behavior as can be seen from the more rectangular cyclic voltammogram. The high fill factor of this device is only slightly reduced when extending the voltage window.

Solvent resistant poly(ProDOT-EDOT$_2$) devices are able to discharge effectively at scan rates as high as 5 Vjs even in low conductivity organic electrolytes such as LiBTifPC (3 mSjcm), the organic soluble version is limited to scan rates<250 mVjs.

Figure 9:
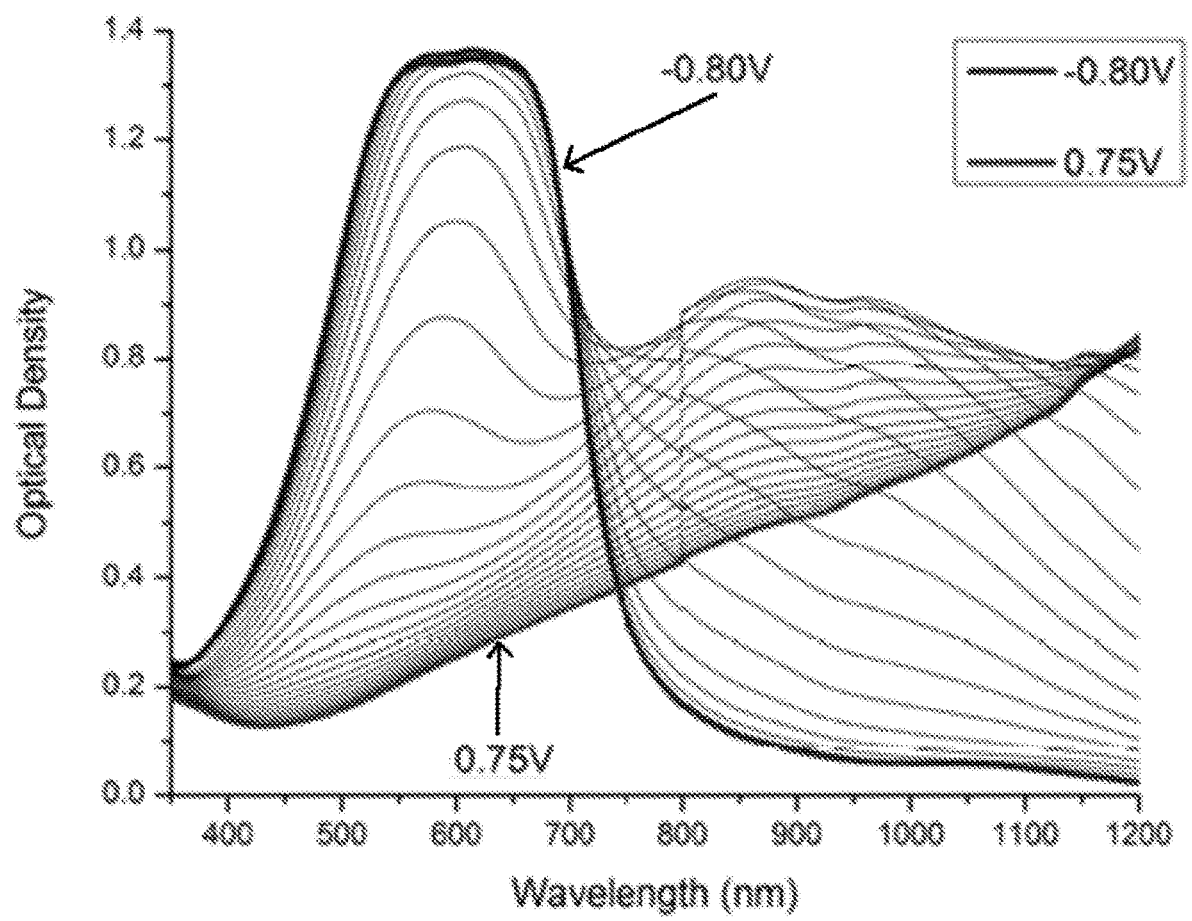
FIG. 9 UV-Vis-NIR spectra as a function of applied potential for a solvent resistant ProDOT-EDOT in aqueous electrolyte.

Solution processing of the water-soluble poly(ProDOT-EDOT$_2$) onto high-surface area carbon substrates, namely a non-woven CNT textile allows for the fabrication of flexible supercapacitive devices. Using a 0.5 M LiBTI aqueous electrolyte, these devices exhibit fill factors in excess of 60% at scan rates below 200 mV js, and as high as 76% at a scan rate of 20 mV js. Further, stability to repeated cycling has been observed, with no change in the value of areal capacitance observed after 5000 cycles at a scan rate of 50 mV/s. In addition, electrochromism is exemplified by magenta, purple and blue (FIG. 9) colors are accessible) to transmissive states. The spectroelectrochemical results below, from solvent resistant Poly(ProDOT-EDOT) in NaCl/HzO, demonstrate this.

Figure 10:
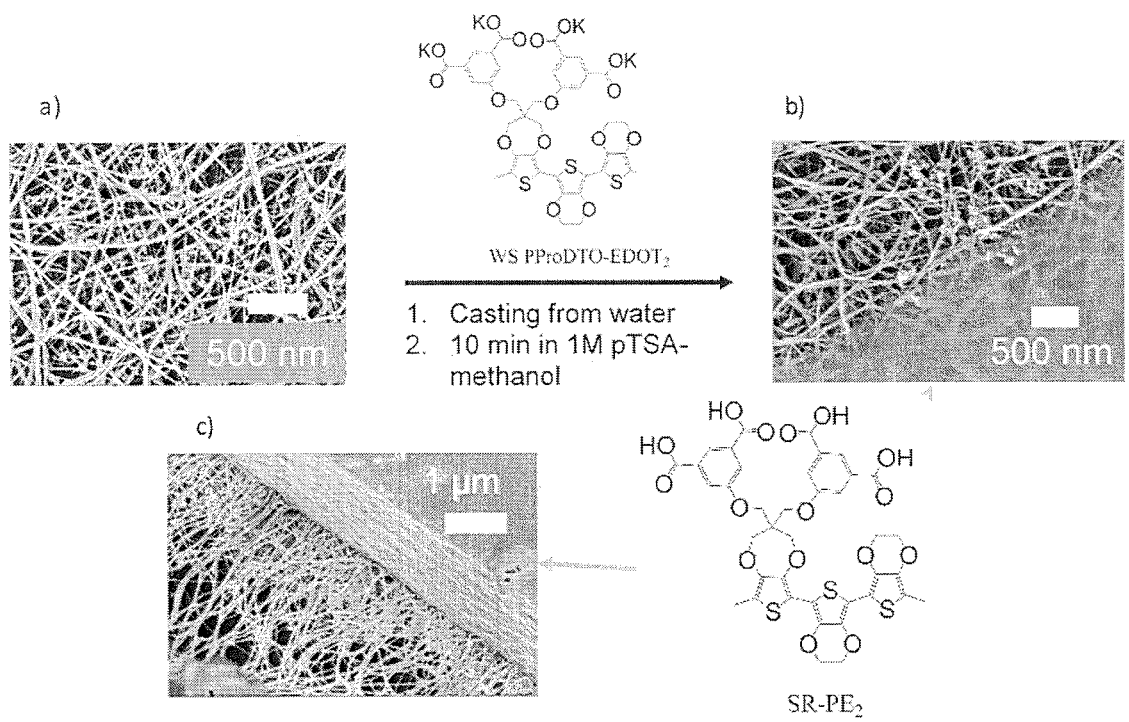
FIG. 10 is SEM images of (a) bare carbon nanotube-textile (CNT-T), (b) top view of solvent resistant ProDOT-EDOT$_2$ film edge on CNT-T surface, (c) cross section of ProDOT-EDOT$_2$ film on CNT-T surface.

Work on developing flexible supercapacitors has focused on incorporating the water processable ProDOT-EDOT$_2$ (PE$_2$) copolymer into commercially available unwoven carbon nanotube textiles (CNT-T). These CNT-T substrates present advantages in terms of their high surface area and mechanical pliability, and they can be prepared on industrially relevant scales. The water soluble P(ProDOT-EDOT$_2$) was incorporated into the CNT-T substrates via drop casting to attain a range of mass loadings from 20% to 170% relative to the substrate mass. FIG. 10 shows scanning electron microscope images of the composite electrodes where a dense polymer layer appears above the carbon nanotube surface.

Figure 11A:
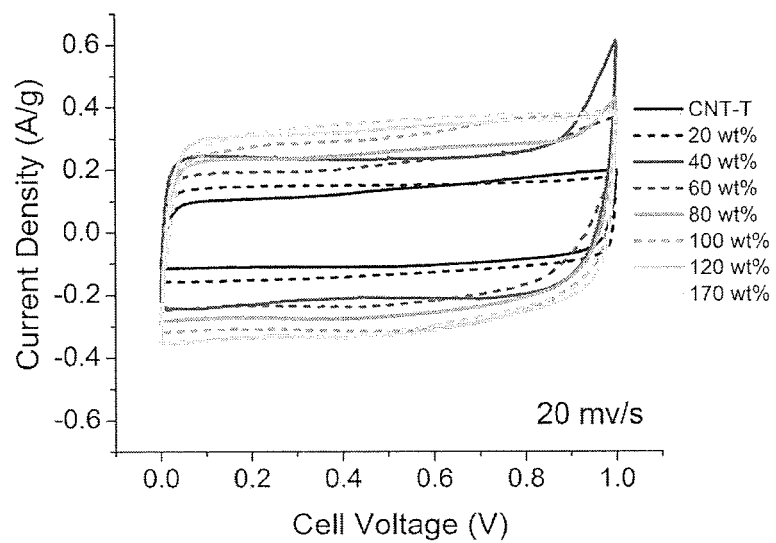
FIGS. 11A-11D are 2 (FIG. 11A) Cyclic voltammogram for symmetrical CNT-ProDOT-EDOT$_2$ devices composed of various PE$_2$ mass loadings (0-170 wt %) in 0.5 M KCl.
Figure 11B:
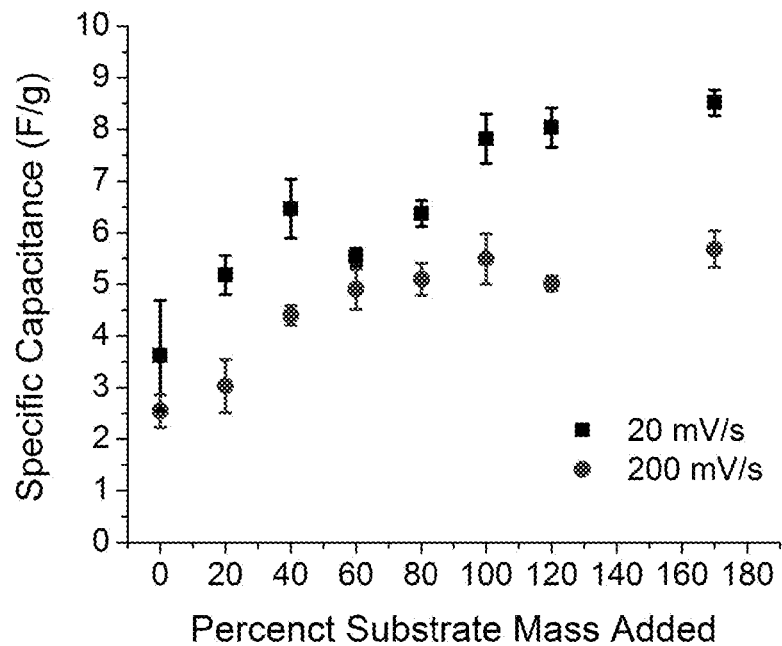

Symmetrical supercapacitor devices were assembled for each mass loading using 0.5M KCl as an electrolyte with filter paper separator and a stainless steel shim as a current collector. Cyclic voltammograms normalized to total electrode mass as well as calculated capacitance are shown in FIGS. 11A-11B This allowed us to study the optimal mass loading in terms of increased energy density while retaining the high rate capability of the polymer. After drop casting, the films were rendered solvent resistant by dipping them in p-toluene sulfonic acid/methanol.

Figure 2A:
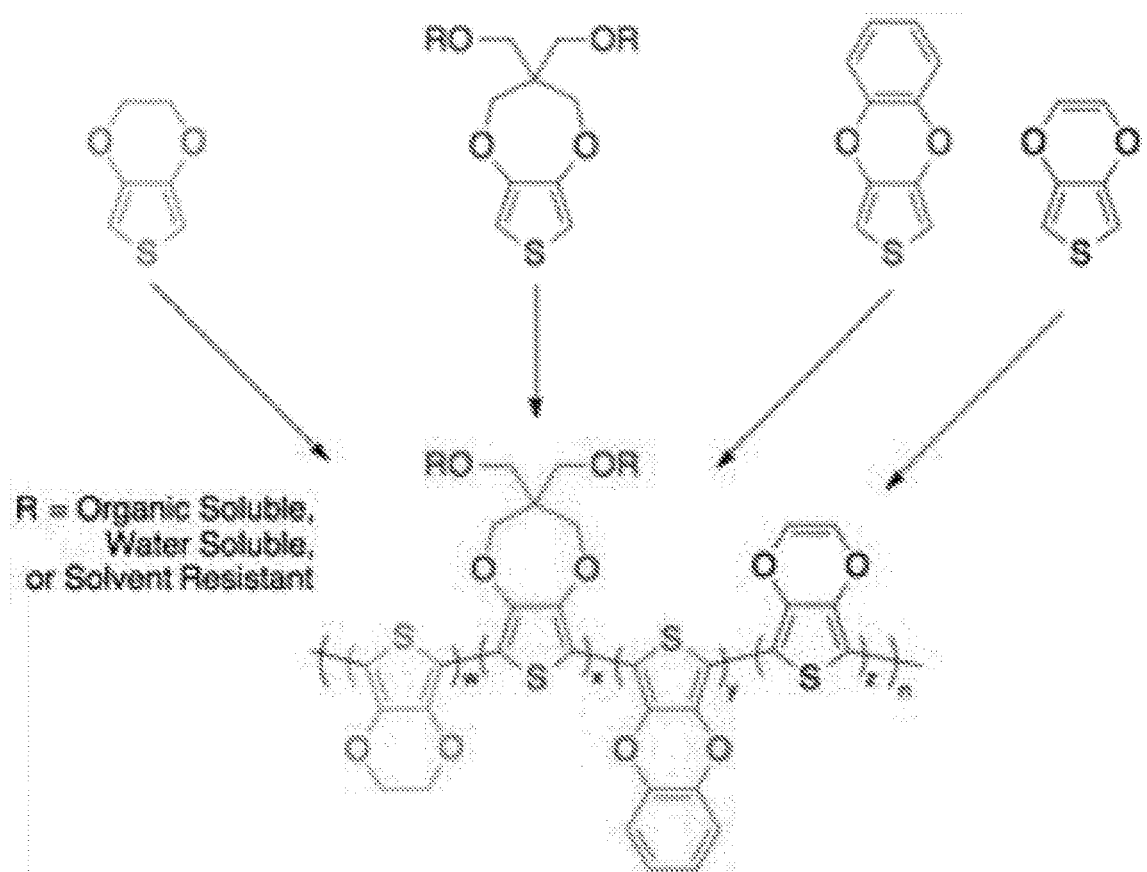
FIG. 2A shows possible repeat unit structures for redox active copolymers where the nature R groups controls solubility.
Figure 2B:
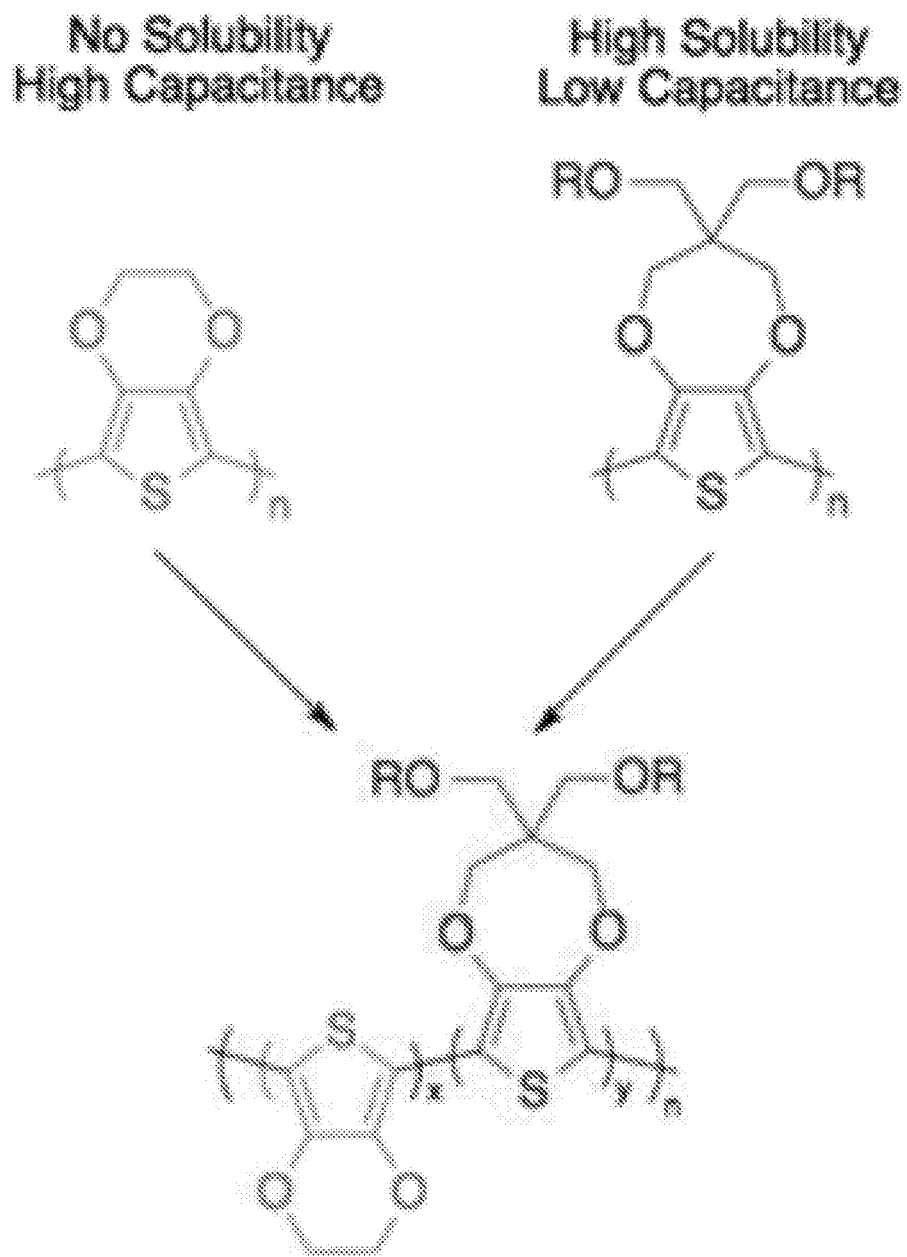
FIG. 2B is the design approach for generating soluble, highly capacitive polymers where the ethylenedioxythiophene units provide capacitance and the propylenedioxythiophene units provide solubility.
Figure 3:
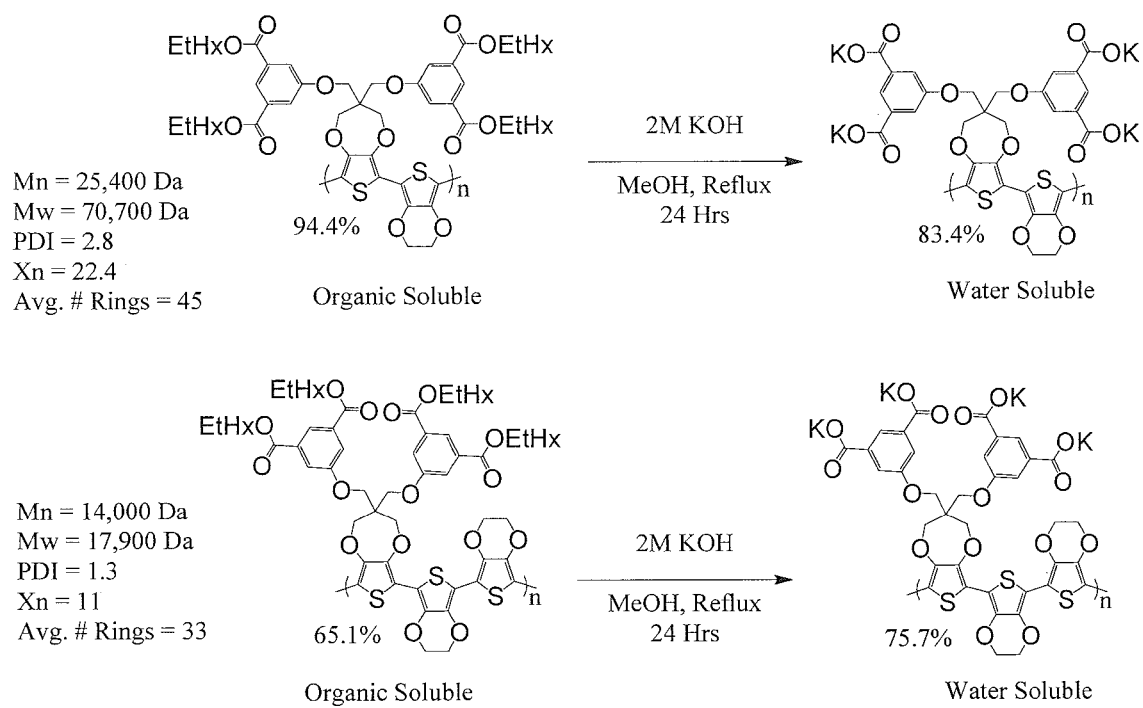
FIG. 3 Top row: treatment of the ProDOT-EDOT copolymer with base to convert the organic soluble form to the water soluble polyelectrolyte form. Bottom row: treatment of the ProDOT-EDOT$_2$ copolymer with base to convert the organic soluble form to the water soluble polyelectrolyte form.
Figure 11C:
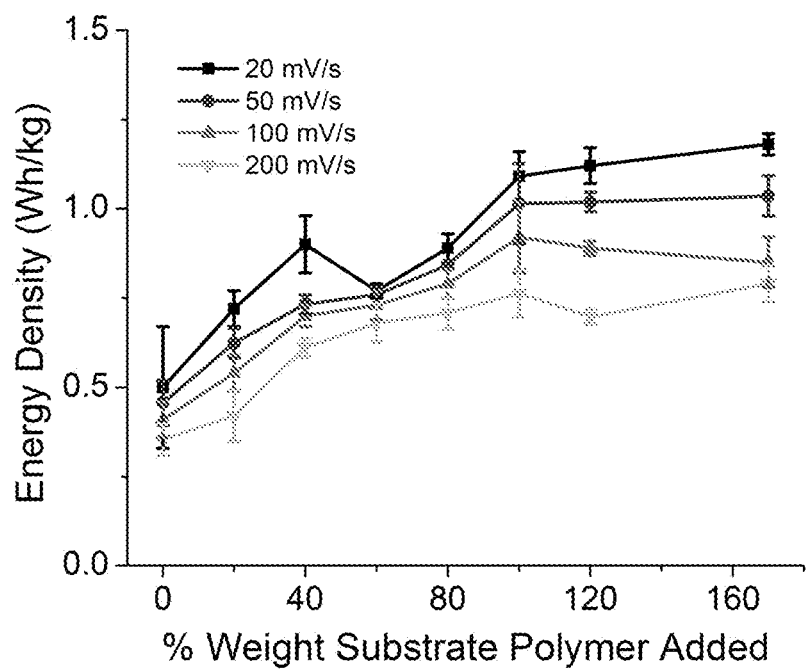
Figure 11D:
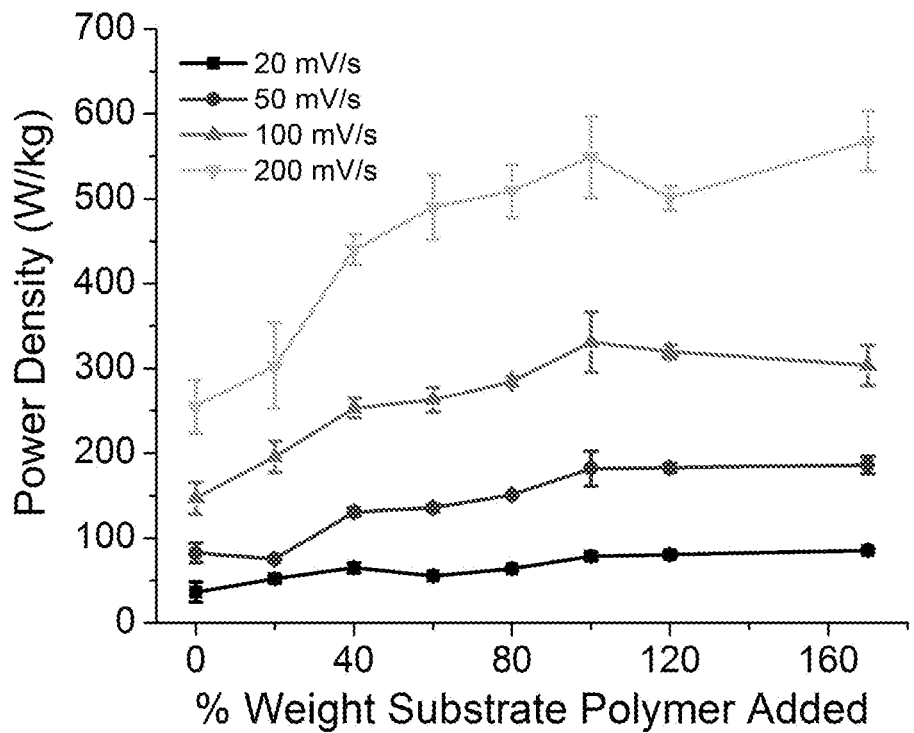
Figure 12A:
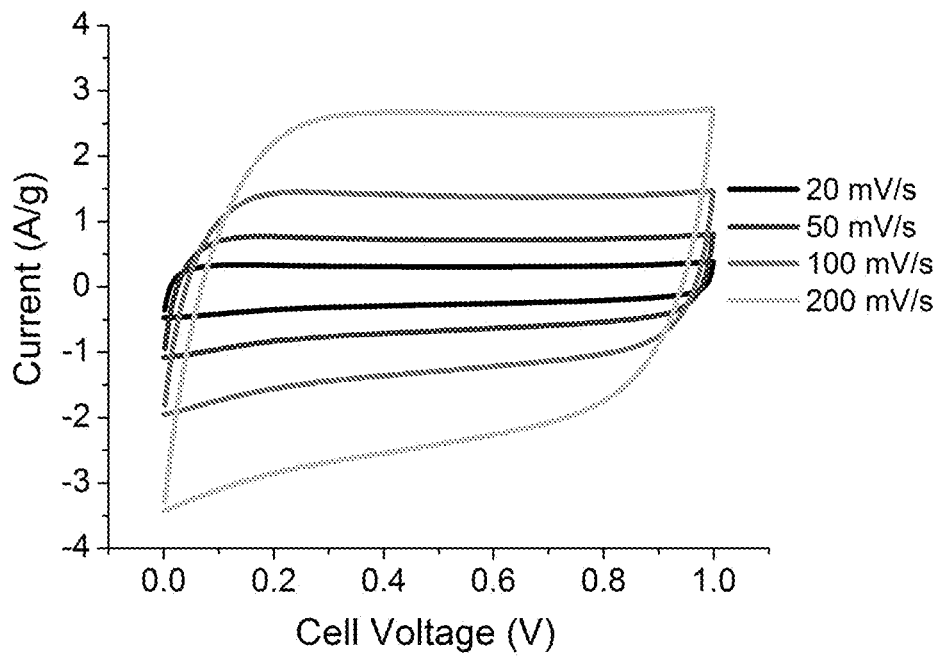
FIGS. 12A-12D are (FIG. 12A) Cyclic voltammogram at increasing scan rates for 100 wt % symmetrical ProDOT-EDOT$_2$ device in 0.5 M KCl with graphite foil current collectors.
Figure 12B:
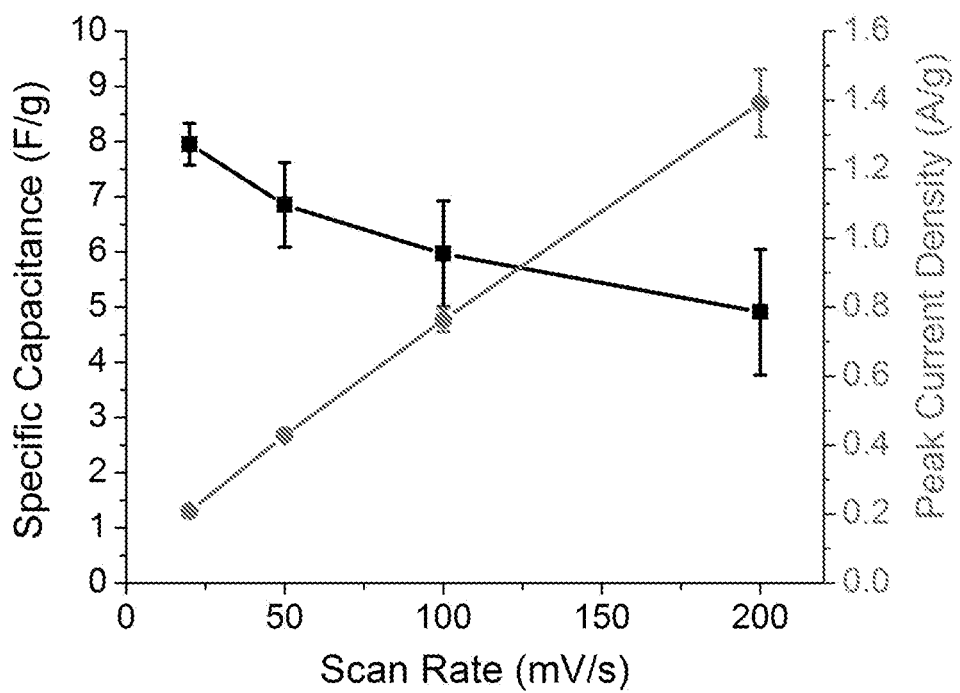
Figure 12C:
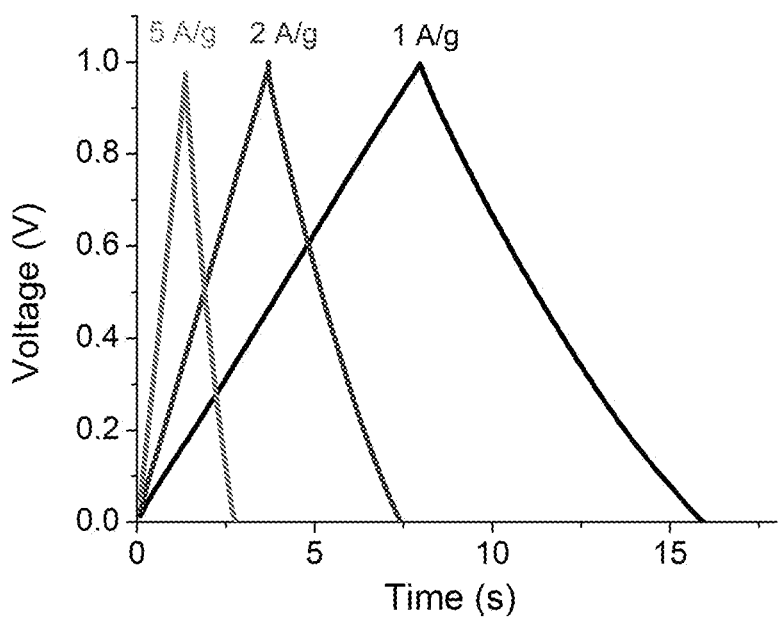
Figure 12D:
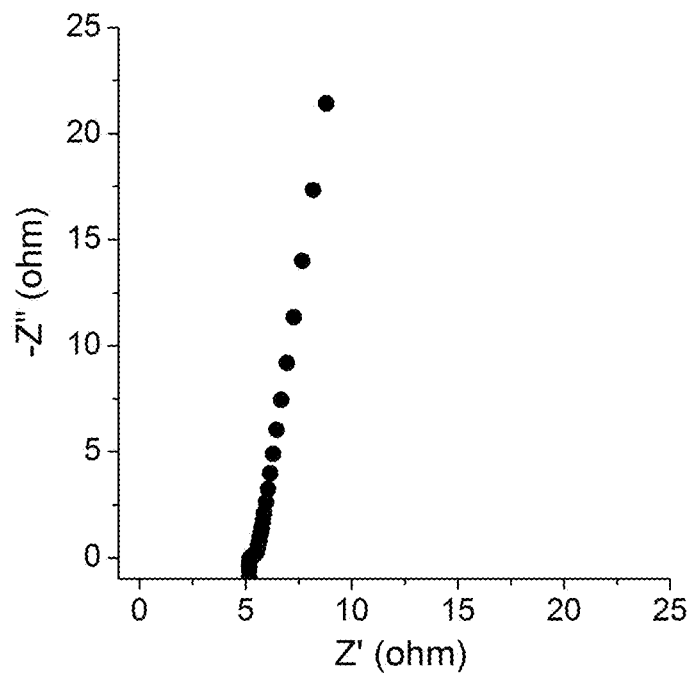

FIGS. 11C-11D shows the evolution of energy and power density as the polymer mass loading is increased to 170% susbstrate mass added. Overall optimum performance was achieved for a mass loading of 100 wt % added polymer. These devices resulted in a 2× increase in specific mass capacitance and a 4× increase in areal capacitance over the non-functionalized CNT-T using a 0.5 M KCl device electrolyte. These devices exhibit linear scan rate dependence up to 200 mV/s (5 second discharge). The energy density is 1.2±1.09±0.07 Wh/kg at a power density of 78±5 W/kg as shown in FIG. 2. The maxium power density achieved for the 100 wt % added polymer device was 550±50 W/kg at the 200 mV/s scan rate. FIG. 3 below summarizes the performance of 100 wt % PE$_2$ devices assembled on flexible graphite foil current collectors showing highly rectangular cyclic voltammograms and symmetrical galvanic cycling curves at currents as high as 5 amperes per gram. The impedance spectroscopy shows very small charge transfer resistance (<1Ω) and a 5Ω equivalent series resistance value.

Figure 13A:
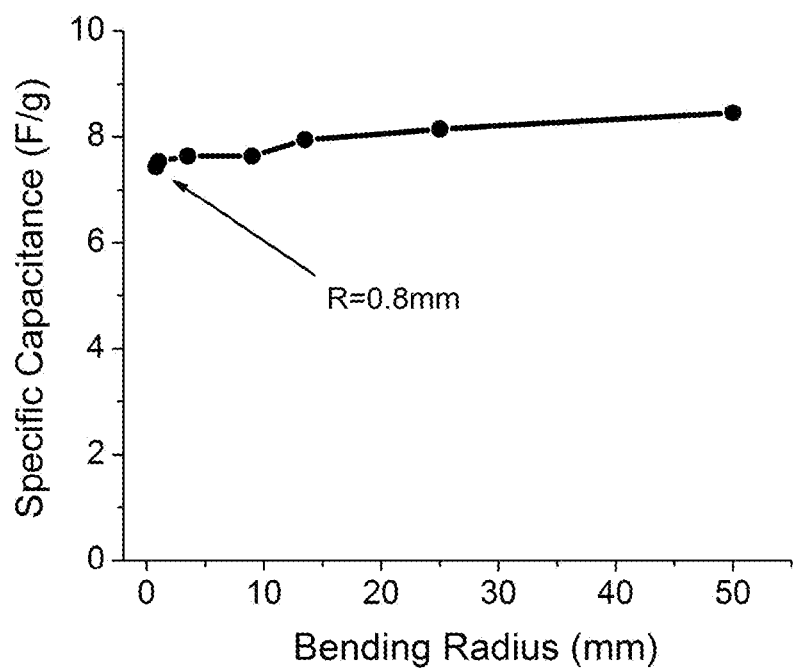
FIGS. 13A-13B are 100 wt % ProDOT-EDOT$_2$ device flexibility showing charge capacity retention calculated from cyclic voltammetry at 20 mV/s when (FIG. 13A) bent to radii down to 0.8 mm and (FIG. 13B) bent repeatedly for 2000 cycles at a radius of 3.5 mm.
Figure 13B:
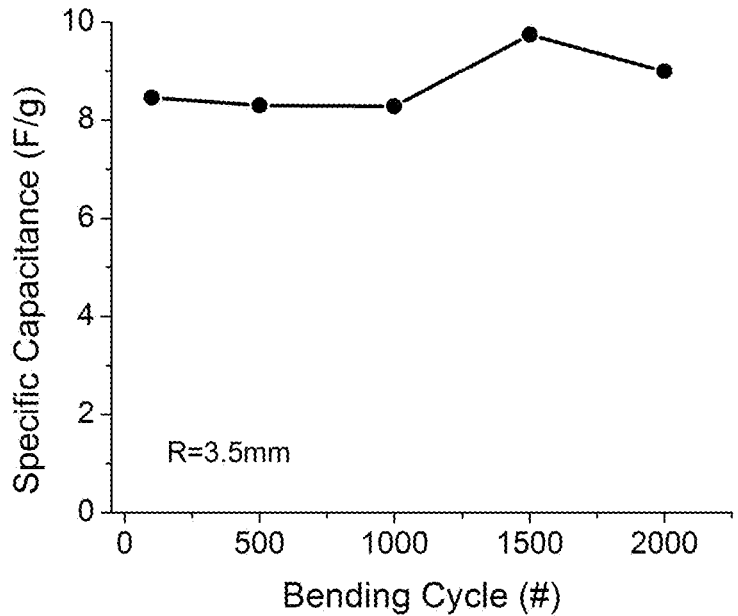
Figure 14:
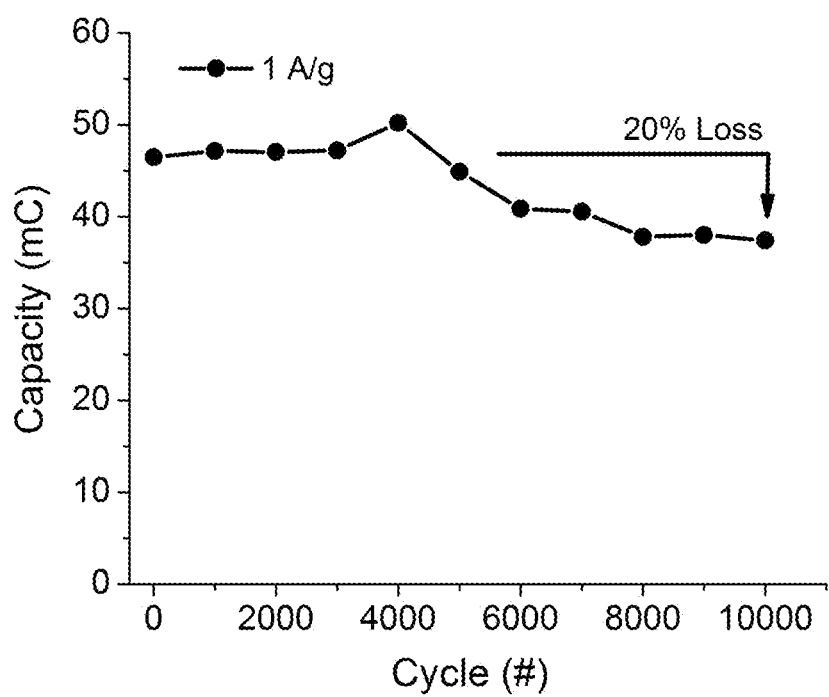
FIG. 14 depicts the electrochemical cycling stability of 100 wt % polymer added device cycled at 1 amp per gram.

When using flexible graphite foil current collectors, encapsulated devices showed a high level of mechanical pliability. FIGS. 13A-13B demonstrate the retention of charge when the device is bent to a radius of 0.8 mm as well as flexed at a 3.5 mm radius 2000 times.

Figure 15:
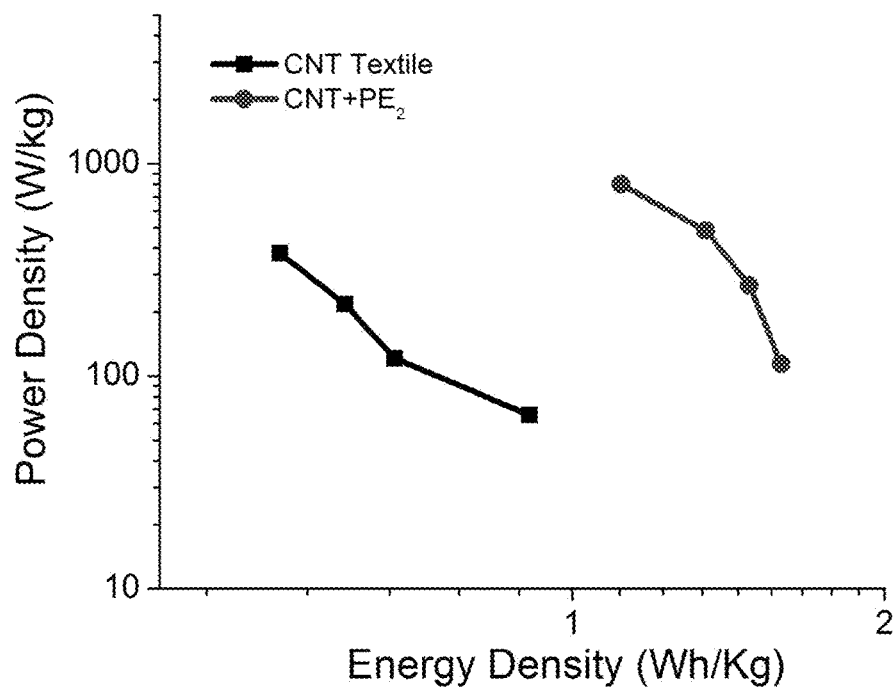
FIG. 15 depicts Ragone plot comparing the power density and energy density of a bare CNT-Textile device with a 100 wt % ProDOT-EDOT$_2$/CNT-T device showing data for scan rates of 20, 50, 100, and 200 mV/s.
Figure 16:
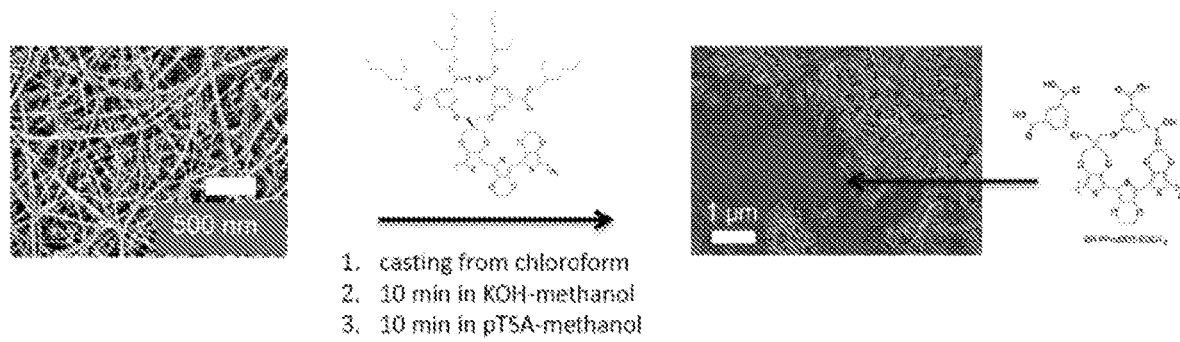
FIG. 16 Scanning electron microscope images of blank CNT-T (left) and solvent resistant ProDOT-EDOT$_2$ film (right) on surface of the CNT-T after base and acid treatment FIGS. 17A-17C Electrochemical performance of 100 wt % ProDOT-EDOT$_2$ devices comparing electrodes processed from CHCl$_3$ versus electrodes processed from water showing the (FIG. 17A) cyclic voltammetry at 20 mV/s, (FIG. 17B) the scan rate dependence of capacitance versus scan rate for the two processing methods, and (FIG. 17C) Nyquist plot measured from 100 kHz to 0.1 Hz.

These 100 wt % devices also showed stability over repeated electrochemical cycling by retaining 80% of the charge storage capability after 10,000 galvanostatic cycles at a current of 1 amp per gram. The Rangone plot in FIG. 15 demonstrates the increase in energy density achieved by incorporating the PE$_2$ copolymer into the CNT-T as well as a slight increase in the corresponding power density was able to wet the CNT-T surface more readily and was able to penetrate through the thickness of the substrate. SEM images shown in FIG. 16 show patches of polymer on the surface without the development of a dense layer as seen from in the films cast from water.

Figure 17A:
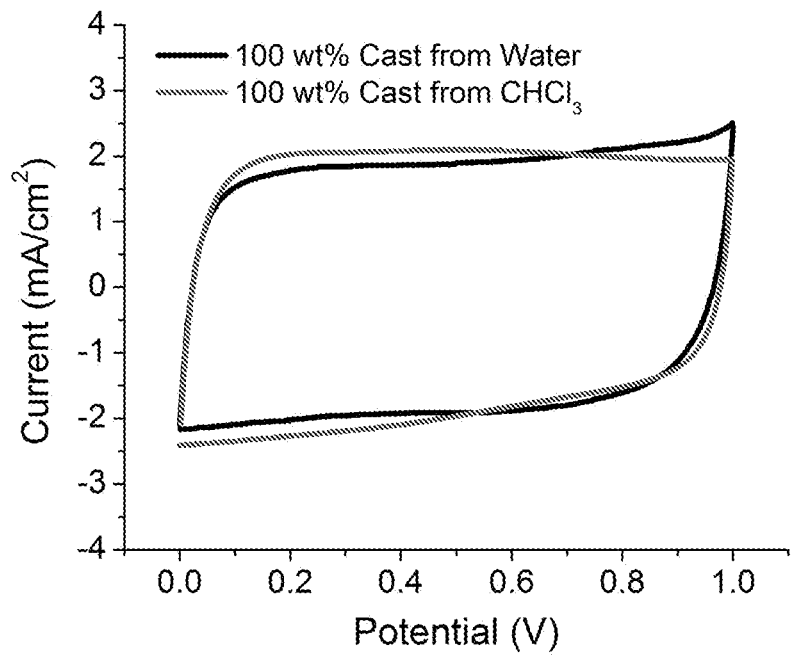
Figure 17B:
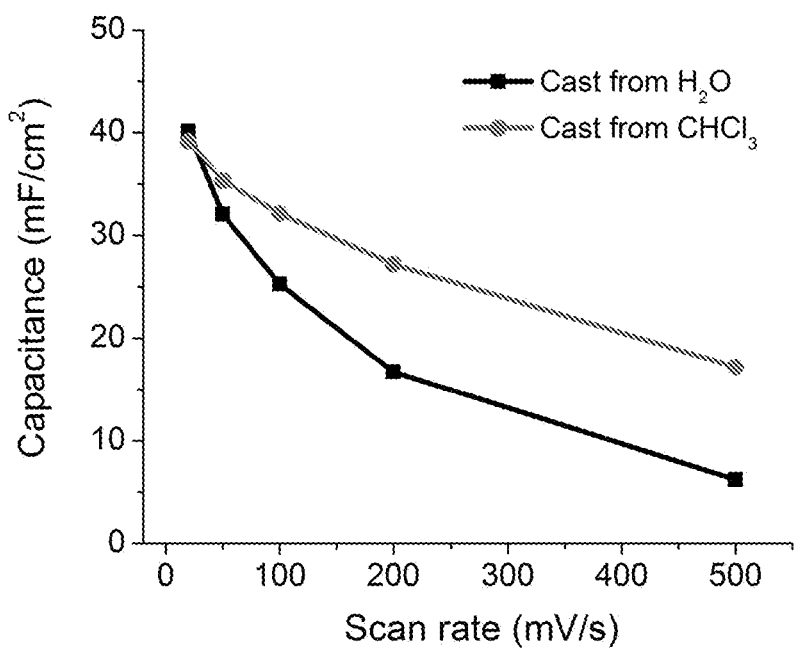
Figure 17C:
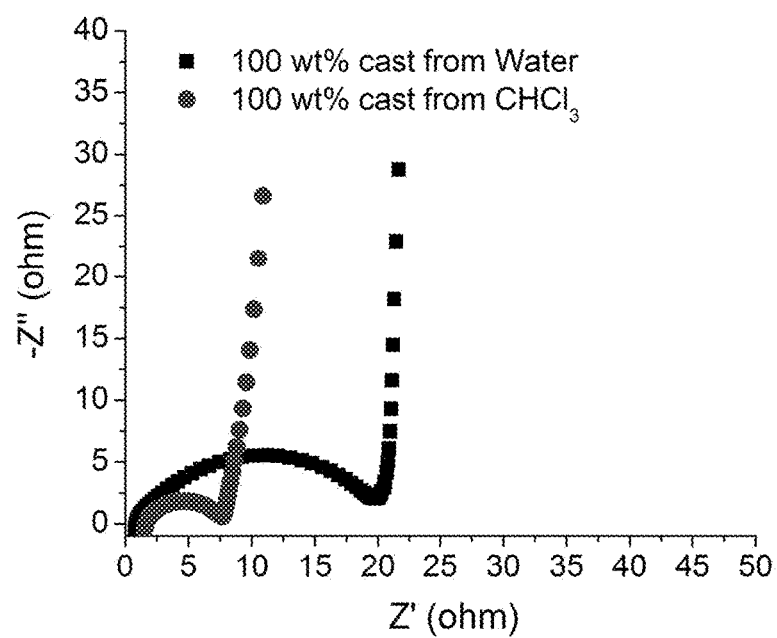

While the capacitance was not expected to increase, the composite electrode was able to retain the capacitance at higher charge/discharge rates and showed two-fold reduction in charge transfer resistance (measured via EIS in FIG. 17B) when the polymer was cast from $CHCl_3$ rather than water indicating improved polymer intercalation into the CNT-T.

Figure 18:
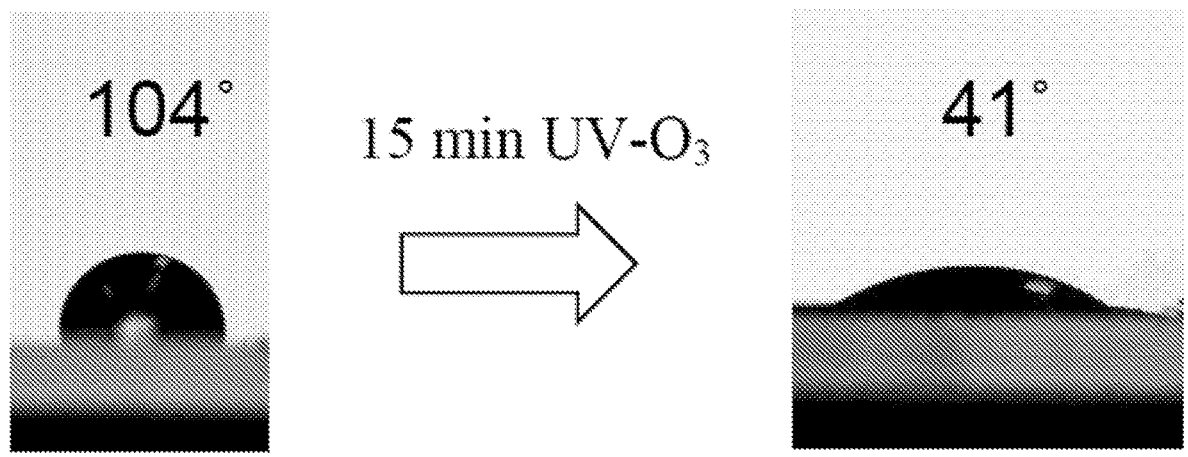
FIG. 18 depicts contact angle of water with the CNT-T before and after 15 min UV-O$_3$ exposure

The other method we evaluated was oxidizing the CNT-T with $UV-O_3$ to make it more hydrophilic to be able to deposit the polymer from water. Contact angle measurements using water shown in FIG. 18 demonstrate the improved wetting achieved by $UV-O_3$ treatment. This treatment improved the wetting of the polymer solution to the point where the polymer completely penetrated through the thickness of the CNT-T.

Figure 19A:
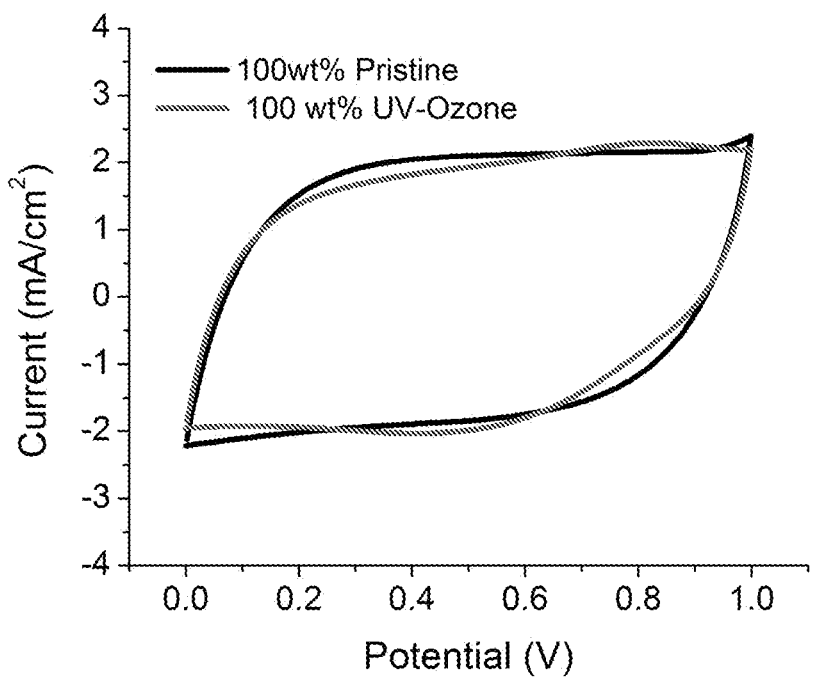
FIGS. 19A-19C depicts the electrochemical performance of 100 wt % ProDOT-EDOT$_2$ devices comparing untreated CNT-T substrates with 15 min UV-O$_3$ treated substrates and the impact on (FIG. 19A) cyclic voltammetry at a scan rate of 20 mV/s, (FIG. 19B) Nyquist plot measured from 100 kHz down to 0.1 Hz and (FIG. 19C) Charge discharge profile at 1 A/g.
Figure 19B:
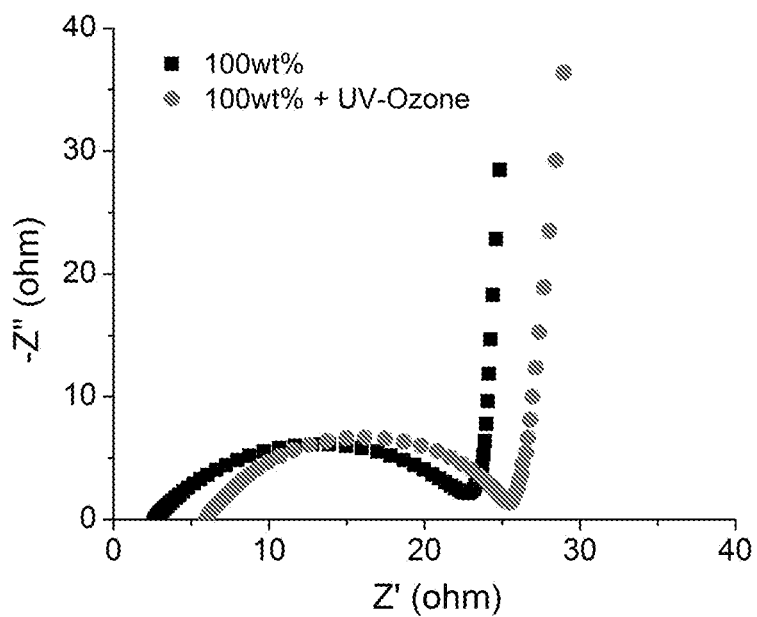
Figure 19C:
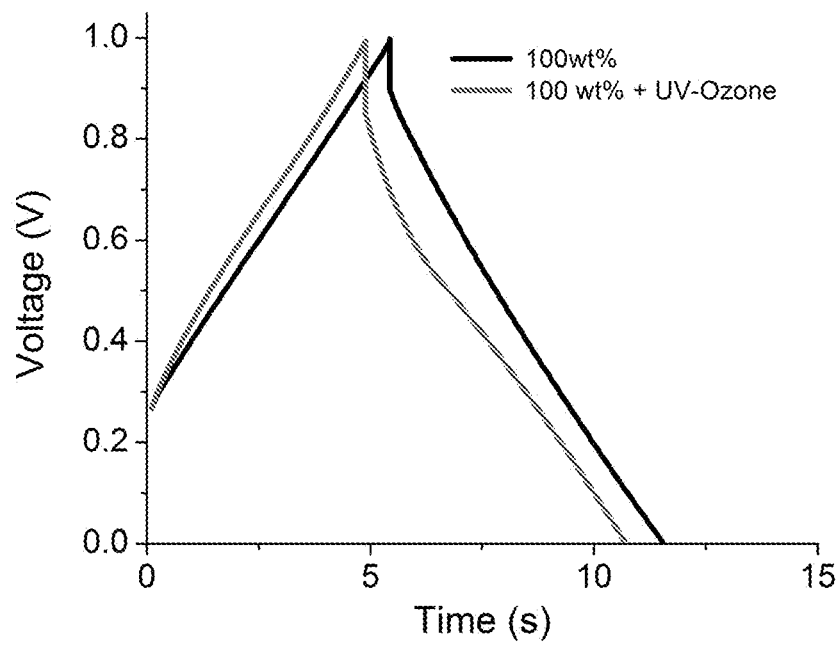
Figure 20:
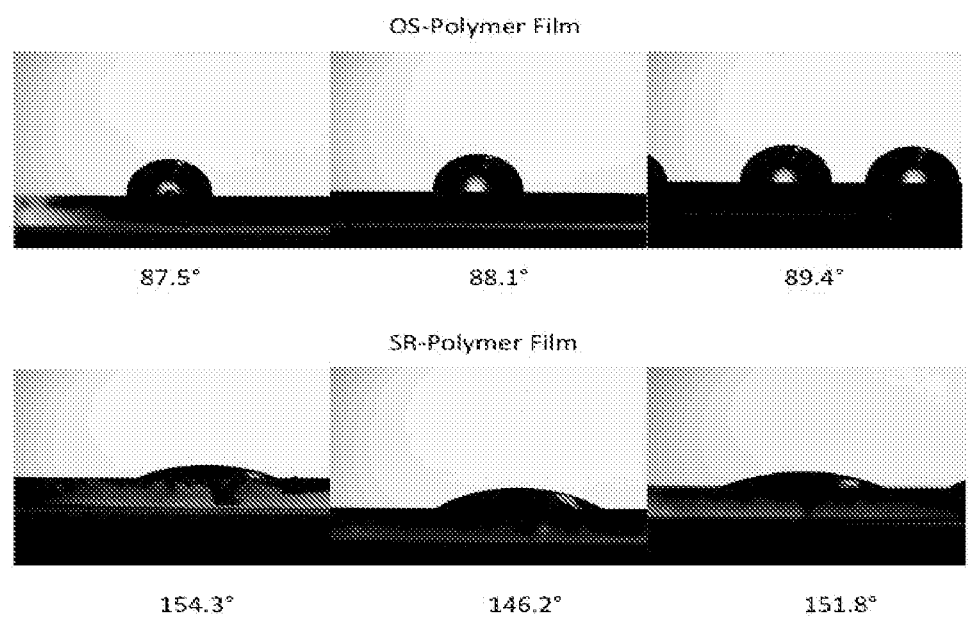
FIG. 20 Contact angle profiles showing water droplets on organic soluble (top) and solvent resistant (bottom) ProDOT-EDOT$_2$ polymer films.
Figure 21:
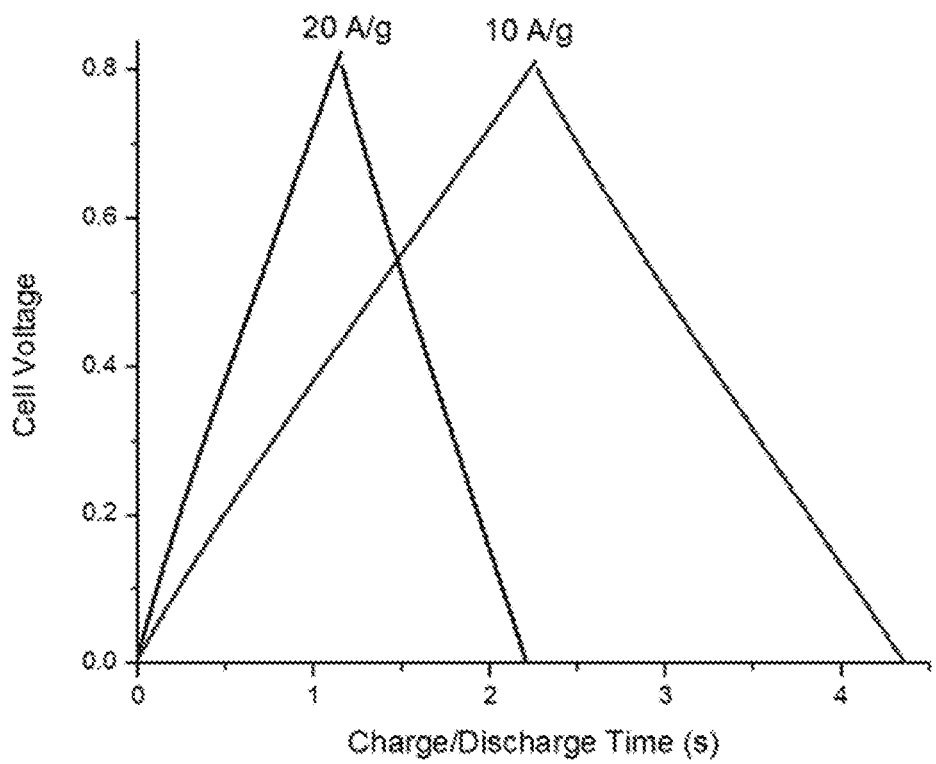
FIG. 21 Charge-discharge profile at 10 and 20 A/g for supercapacitor device based on solvent resistant ProDOT-EDOT$_2$ in 0.5M NaCl aqueous electrolyte.
Figure 22:
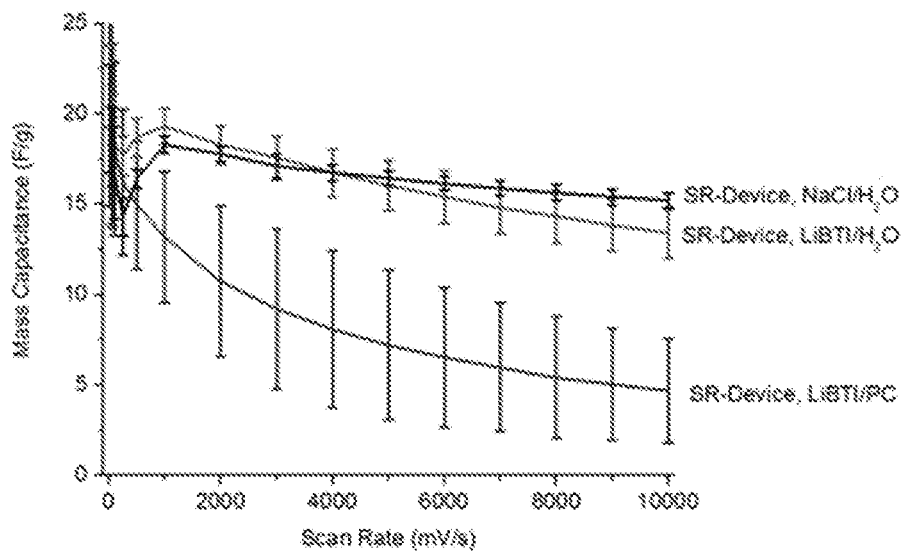
FIG. 22 Mass capacitance as a function of scan rate for supercapacitor devices incorporating solvent resistant ProDOT-EDOT$_2$ and various electrolytes.
Figure 23:
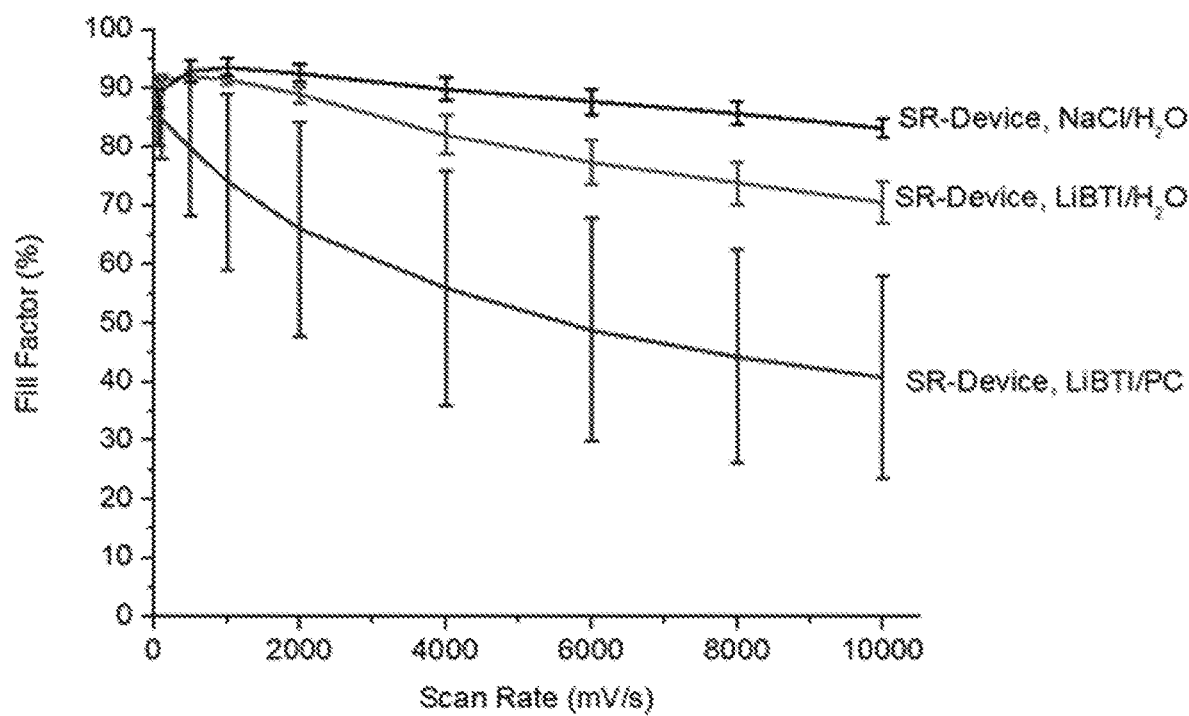
FIG. 23 Fill factor as a function of scan rate for supercapacitor devices incorporating solvent resistant ProDOT-EDOT$_2$ in various electrolytes.

Despite the improved wetting of the aqueous $PE_2$ solution, there was no significant improvement in capacitance or in the charge/discharge rates (FIGS. 19A-19C). This is likely a result of the lower conductivity of the CNT-T because of the broken $sp^2$ character of the carbon after $UV-O_3$ treatment.

Despite this improvement however, the SEM microscope images indicated that the majority of the polymer resided on the surface of the CNT-T as a result of poor wetting between the aqueous $PE_2$ solution and the hydrophobic carbon nanotubes. Two approaches were taken in order to improve the wetting of the polymer solution in order to take full advantage of the potentially large double layer capacitance offered by the 3D structure of the carbon nanotube substrate. The first approach involved casting the solution from the organic phase, then saponifying the ester side chains in base followed by the same acid treatment to render the polymer solvent resistant. The polymer solution It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A supercapacitor comprising two electrodes in contact with an electrolyte, wherein the electrolyte is in contact with both electrodes; and wherein at least one of the electrodes comprises a conducting substrate and a layer of a conjugated copolymer, wherein the conjugated copolymer comprises a plurality of a first monomer subunit having two or more acid side chains and a plurality of a second monomer subunit that does not have the acid side chains, wherein the number of first monomer subunits in the conjugated copolymer is at least the minimum number of first monomer subunits such that the conjugated copolymer is solvent resistant, wherein the first monomer subunit has a structure according to any one of the following formulas or a derivative thereof:

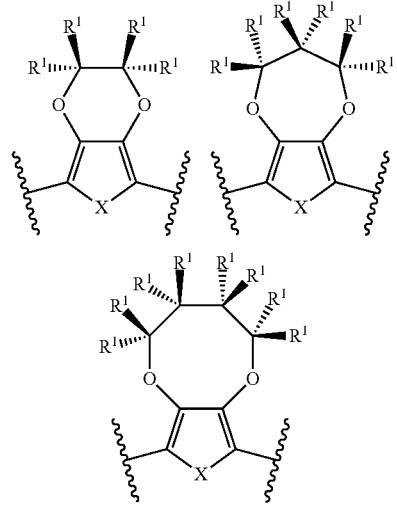

wherein each occurrence of $R^1$ is independently selected from the group consisting of $C_1$-$C_{30}$ carboxylic acid side chains, $C_1$-$C_{30}$ thiocarboxylic acid side chains, $C_1$-$C_{30}$ dithiocarboxylic acid side chains, $C_1$-$C_{30}$ phosphonic acid side chains, $C_1$-$C_{30}$ boronic acid side chains, H, $C_1$-$C_{30}$ alkyl sidechains, $C_2$-$C_{30}$ alkenyl side chains, $C_2$-$C_{30}$ alkynyl side chains, $C_3$-$C_{30}$ cycloalkyl side chains, $C_1$-$C_{30}$ heterocycloalkyl side chains, $C_3$-$C_{30}$ cycloalkenyl side chains, $C_1$-$C_{30}$ heterocycloalkenyl side chains, aryl side chains, heteroaryl side chains, and a combination thereof, so long as at least two occurrences of $R^1$ are selected from the group consisting of $C_1$-$C_{30}$ carboxylic acid side chains, $C_1$-$C_{30}$ thiocarboxylic acid side chains, $C_1$-$C_{30}$ dithiocarboxylic acid side chains, $C_1$-$C_{30}$ phosphonic acid side chains, and $C_1$-$C_{30}$ boronic acid side chains, and wherein the second monomer subunit has a structure selected from the group consisting of structures according to Formula 1B, Formula 2B, Formula 3B, Formula 4B, Formula 5B, Formula 6B, and derivatives thereof Formula 1B

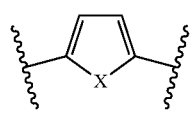

Formula 2B

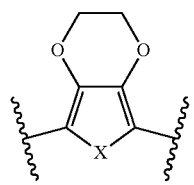

Formula 3B

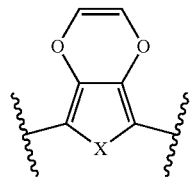

-continued

Formula 4B

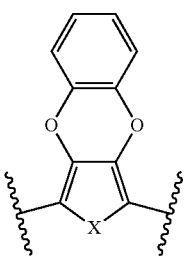

Formula 5B

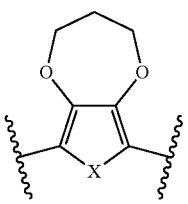

Formula 6B

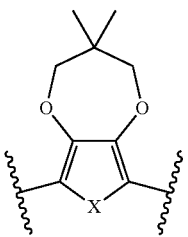

wherein each occurrence of X is independently selected from the group consisting of S, Se, O, and NR, where R is a H, phenyl, benzyl, or $C_1$-$C_{30}$ substituent.

2. The supercapacitor of claim 1, wherein each occurrence of $R^1$ is independently selected from the group consisting of substituted and unsubstituted $C_6$-$C_{30}$ aromatic carboxylic acids and substituted and unsubstituted $C_6$-$C_{30}$ aromatic phosphonic acids.

3. The supercapacitor of claim 1, wherein the first monomer subunit has a structure according to the following formula or a derivative thereof

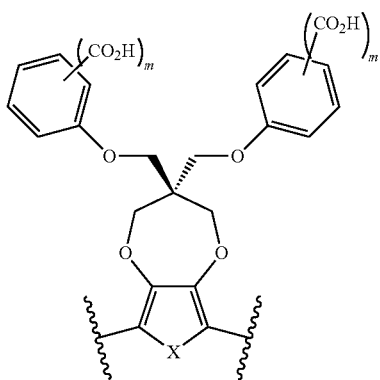

wherein each occurrence of m is independently an integer from 1 to 4, and wherein X is S, Se, O, or NR, where R is a H, phenyl, benzyl, or $C_1$-$C_{30}$ substituent.

4. The supercapacitor of claim 1, wherein the conducting substrate is selected from the group consisting of a conducting plastic substrate, conducting paper substrate, a conducting textile substrate, conducting cellulose substrate, a carbon nanotube substrate, a graphite or graphene substrate, a carbon foam substrate, a metal substrate, a metal oxide substrate, and a conductive polymer substrate.

5. The supercapacitor of claim 4, wherein the mass loading of the conjugated copolymer onto the substrate is about 20% to 200% (w/w/) based upon the weight of the substrate.

6. The supercapacitor claim 4, wherein the layer of the conjugated copolymer has an average thickness of about 100 nm to 2.5 μm.

7. The supercapacitor of claim 1, wherein the conjugated copolymer comprises repeat units having a structure selected from the group consisting of A-B, A-B-B, A-B-B-B, A-B-B-B-B, A-A-B, and A-A-B-B, wherein A represents the first monomer subunit and B represents the second monomer subunit.

8. The supercapacitor of claim 1, wherein the oxidation onset of the conjugated copolymer is at least 0.3 V less than the oxidation onset of the otherwise same polymer except without the second monomer subunits when measured under the same conditions.

9. The supercapacitor of claim 1, wherein the electrolyte is selected from the group consisting of an organic electrolyte, an aqueous electrolyte, a biological electrolyte, a solid state electrolyte, and a combination thereof.

10. The supercapacitor of claim 1, wherein the electrolyte is an aqueous salt solution or an organic salt solution comprising a salt selected from the group consisting of sodium chloride, potassium chloride, tetrabutylammonium hexafluorophosphate (TBAPF$_6$), and lithium bis(trifluoromethylsulfonyl)imide (LiBTI).

11. The supercapacitor of claim 1, wherein the supercapacitor has an energy density of about 0.5 Wh/kg to about 2.5 Wh/kg based on the mass of the electrode material at a scan rate of about 100 mV/s.

12. The supercapacitor of claim 1, wherein the supercapacitor has a power density of about 150 W/kg to about 1000 W/kg based on the mass of the electrode material at a scan rate of about 100 mV/s.

13. The supercapacitor of claim 1, wherein the supercapacitor has a specific mass capacitance that is at least four times the specific mass capacitance of the otherwise same supercapacitor except not containing the conjugated copolymer when measured under the same conditions.

14. The supercapacitor of claim 1, wherein each acid side chain comprises a carboxylic acid, a thiocarboxylic acid, dithiocarboxylic acid, a phosphonic acid, or a boronic acid.

15. The supercapacitor of claim 1, wherein each acid side chain comprises an aromatic carboxylic acid or an aromatic phosphonic acid.

* * * * *